(12) United States Patent
Wang et al.

(10) Patent No.: US 11,729,776 B2
(45) Date of Patent: Aug. 15, 2023

(54) METHODS AND APPARATUS FOR TRANSMITTING SIDELINK CONTROL MESSAGES

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Franklin Park, NJ (US); Xiaoxia Zhang, San Diego, CA (US); Jing Sun, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 17/149,418

(22) Filed: Jan. 14, 2021

(65) Prior Publication Data

US 2022/0225375 A1    Jul. 14, 2022

(51) Int. Cl.
*H04W 72/04* (2023.01)
*H04W 72/21* (2023.01)
*H04W 72/02* (2009.01)
*H04L 5/00* (2006.01)
*H04B 7/06* (2006.01)
*H04L 1/1812* (2023.01)
*H04W 72/1263* (2023.01)

(52) U.S. Cl.
CPC .......... *H04W 72/21* (2023.01); *H04B 7/0626* (2013.01); *H04L 1/1819* (2013.01); *H04L 5/0055* (2013.01); *H04W 72/02* (2013.01); *H04W 72/1263* (2013.01)

(58) Field of Classification Search
CPC ............. H04W 72/1284; H04W 72/02; H04W 72/1263; H04B 7/0626; H04L 1/1819; H04L 5/0055
See application file for complete search history.

(56) References Cited

U.S. PATENT DOCUMENTS

| 11,265,764 | B2 | 3/2022 | Tang |
| 2018/0049220 | A1 | 2/2018 | Patil et al. |
| 2018/0097609 | A1 | 4/2018 | Tiirola et al. |
| 2018/0376525 | A1* | 12/2018 | Feng ................ H04W 72/0453 |

(Continued)

FOREIGN PATENT DOCUMENTS

| WO | 2019028847 A1 | 2/2019 |
| WO | WO-2021090248 A1 * | 5/2021 |

OTHER PUBLICATIONS

R1-1910139, Fujitsu, Discussion on physical layer procedure for NR V2X, 3GPP TSG RAN WG1 #98bis, Chongqing, China, Oct. 14-20, 2019 (Year: 2019).*

(Continued)

*Primary Examiner* — Mahbubul Bar Chowdhury
(74) *Attorney, Agent, or Firm* — Qualcomm Incorporated

(57) ABSTRACT

Aspects of the present disclosure include methods, apparatuses, and computer readable media for receiving first scheduling information indicating a sidelink uplink control information (S-UCI) resource, receiving second scheduling information indicating one or more physical sidelink feedback channel (PSFCH) resource, and transmitting control information via at least one of the S-UCI resource or the one or more PSFCH resources.

24 Claims, 11 Drawing Sheets

(56) References Cited

U.S. PATENT DOCUMENTS

| | | |
|---|---|---|
| 2019/0306835 A1 | 10/2019 | Hoang et al. |
| 2019/0306923 A1 | 10/2019 | Xiong et al. |
| 2019/0349052 A1 | 11/2019 | Yum et al. |
| 2019/0349066 A1 | 11/2019 | Yang et al. |
| 2019/0387377 A1 | 12/2019 | Zhang et al. |
| 2020/0008266 A1 | 1/2020 | Pan et al. |
| 2020/0037343 A1* | 1/2020 | He .............. H04L 1/1893 |
| 2020/0112400 A1* | 4/2020 | Lee .............. H04L 5/0055 |
| 2020/0178256 A1 | 6/2020 | Tang |
| 2020/0196343 A1 | 6/2020 | Marinier et al. |
| 2020/0260386 A1 | 8/2020 | Ryu et al. |
| 2020/0280338 A1 | 9/2020 | Matsumura et al. |
| 2020/0287654 A1 | 9/2020 | Xi et al. |
| 2020/0313743 A1* | 10/2020 | Park .............. H04L 5/0057 |
| 2020/0344722 A1 | 10/2020 | He et al. |
| 2020/0403749 A1 | 12/2020 | Park et al. |
| 2021/0045088 A1 | 2/2021 | Cai et al. |
| 2021/0105104 A1 | 4/2021 | Cao et al. |
| 2021/0127383 A1 | 4/2021 | Hui et al. |
| 2021/0136744 A1 | 5/2021 | Lu et al. |
| 2021/0144736 A1 | 5/2021 | Li et al. |
| 2021/0144750 A1 | 5/2021 | Cao et al. |
| 2021/0153167 A1 | 5/2021 | Sarkis et al. |
| 2021/0219320 A1 | 7/2021 | Belleschi et al. |
| 2021/0243796 A1* | 8/2021 | Panteleev .............. H04W 8/24 |
| 2021/0266869 A1 | 8/2021 | Jeong |
| 2021/0274432 A1 | 9/2021 | Yang |
| 2021/0321380 A1* | 10/2021 | Zhao .............. H04L 5/0091 |
| 2021/0352710 A1 | 11/2021 | Lu et al. |
| 2022/0039080 A1 | 2/2022 | Khoryaev et al. |
| 2022/0053495 A1 | 2/2022 | Huang et al. |
| 2022/0095366 A1* | 3/2022 | Lee .............. H04W 28/0278 |
| 2022/0167313 A1 | 5/2022 | Zhou et al. |
| 2022/0174657 A1 | 6/2022 | Wang et al. |
| 2022/0174774 A1 | 6/2022 | Tseng et al. |
| 2022/0182985 A1 | 6/2022 | Ding et al. |
| 2022/0191837 A1 | 6/2022 | Ding et al. |
| 2022/0225376 A1 | 7/2022 | Wang et al. |
| 2022/0255680 A1 | 8/2022 | Moon et al. |
| 2022/0256525 A1 | 8/2022 | Lin et al. |
| 2022/0256579 A1 | 8/2022 | Ji et al. |

OTHER PUBLICATIONS

R1-1911030, NEC, Physical layer procedures for NR sidelink, 3GPP TSG RAN WG1 #98bis, Chongqing, China, Oct. 14-20, 2019 (Year: 2019).*

R1-1910375, OPPO, Physical layer procedure for NR-V2X sidelink, 3GPP TSG RAN WG1 #98bis, Chongqing, China, Oct. 14-20, 2019 (Year: 2019).*

Asustek: "Discussion on Simultaneous Configuration of Mode 1 and Mode 2 for a UE", 3GPP Draft, 3GPP TSG RAN WG1 #100, R1-2001018, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 14, 2020 (Feb. 14, 2020), XP051853141, 04 Pages, Section 2.

OPPO: "Discussion on Mode 2 Resource Allocation in NR-V2X", 3GPP Draft, 3GPP TSG-RAN WG1 AH Meeting #1901, R1-1900289, Mode 2 RA, 3rd Generation Partnership Project (3GPP), Mobile Competence Centre, 650, Route Des Lucioles, F-06921, Sophia-Antipolis Cedex, France, vol. RAN WG1, No. Taipei, Jan. 12, 2019-Jan. 25, 2019, Jan. 20, 2019 (Jan. 20, 2019), XP051593203, 11 pages, section "2.2 Sub-mode 2(d)".

Qualcomm Incorporated: "Feature Lead Summary of In-Device Coexistence Aspects in NR-V2X (AI 7.2.4.4)", 3GPP Draft, 3GPP TSG RAN WG1 #98bis, R1-1911684, Feature Lead Summary_NR_V2X-AI7.2.4.4-Coexistence, 3rd Generation Partnership Project (3GPP), Mobile Competence Centre, 650, Route Des Lucioles, F-06921 Sophia-Antipolis Cedex, vol. RAN WG1, No. Chongqing, China, Oct. 14, 2019-Oct. 20, 2019, Oct. 22, 2019 (Oct. 22, 2019), XP051798926, 6 Pages, The whole document.

* cited by examiner

METHODS AND APPARATUS FOR TRANSMITTING SIDELINK CONTROL MESSAGES

BACKGROUND

Aspects of the present disclosure relate generally to wireless communications, and more particularly, to apparatuses and methods for transmitting sidelink control messages.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

In a wireless communication network, sidelink communications between wireless devices, such as a programmable logical controller (PLC) and a sensor/actuator (SA), may require the exchange of sidelink control information (SCI), such as inter-user equipment (UE) coordination (e.g., resource selection, collision detection, etc.), channel state information (CSI) report, hybrid automatic repeat request (HARQ), scheduling request, etc. The types of SCI may include control messages from SA (or client) to PLC (or anchor), also known as sidelink uplink control information (S-UCI), and control messages from PLC to SA, also known as sidelink downlink control information (S-DCI). In conventional networks, SCI transmission may be appended to physical sidelink control channel (PSCCH) or physical sidelink shared channel (PSSCH). In particular, SCI transmissions may not be possible if no data is transmitted in PSSCH, or the SCI may occupy the entire slot. However, allotting an entire slot for transmitting SCI when no data is transmitted may be inefficient. Therefore, improvements may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods by a user equipment (UE) for receiving first scheduling information indicating a sidelink uplink control information (S-UCI) resource, receiving second scheduling information indicating one or more physical sidelink feedback channel (PSFCH) resource, and transmitting control information via at least one of the S-UCI resource or the one or more PSFCH resources.

Other aspects of the present disclosure include a user equipment (UE) having a memory comprising instructions, a transceiver, and one or more processors operatively coupled with the memory and the transceiver, the one or more processors configured to execute instructions in the memory to receive, via the transceiver, first scheduling information indicating a sidelink uplink control information (S-UCI) resource, receive, via the transceiver, second scheduling information indicating one or more physical sidelink feedback channel (PSFCH) resource, and transmit, via the transceiver, control information via at least one of the S-UCI resource or the one or more PSFCH resources.

An aspect of the present disclosure includes a user equipment (UE) including means for receiving first scheduling information indicating a sidelink uplink control information (S-UCI) resource, means for receiving second scheduling information indicating one or more physical sidelink feedback channel (PSFCH) resource, and means for transmitting control information via at least one of the S-UCI resource or the one or more PSFCH resources.

Some aspects of the present disclosure include non-transitory computer readable media having instructions stored therein that, when executed by one or more processors of a user equipment (UE), cause the one or more processors to receive first scheduling information indicating a sidelink uplink control information (S-UCI) resource, receive second scheduling information indicating one or more physical sidelink feedback channel (PSFCH) resource, and transmit control information via at least one of the S-UCI resource or the one or more PSFCH resources.

Aspects of the present disclosure include methods by a user equipment (UE) for identifying first scheduling information indicating a sidelink downlink control information (S-DCI) resource, identifying second scheduling information indicating one or more physical sidelink feedback channel (PSFCH) resource, and transmitting control information via at least one of the S-DCI resource or the one or more PSFCH resources.

Other aspects of the present disclosure include a user equipment (UE) having a memory comprising instructions, a transceiver, and one or more processors operatively coupled with the memory and the transceiver, the one or more processors configured to execute instructions in the memory to identify first scheduling information indicating a sidelink downlink control information (S-DCI) resource, identify second scheduling information indicating one or more physical sidelink feedback channel (PSFCH) resource, and transmit, via the transceiver, control information via at least one of the S-DCI resource or the one or more PSFCH resources.

An aspect of the present disclosure includes a user equipment (UE) including means for identifying first scheduling information indicating a sidelink downlink control information (S-DCI) resource, means for identifying second scheduling information indicating one or more physical sidelink feedback channel (PSFCH) resource, and means for transmitting control information via at least one of the S-DCI resource or the one or more PSFCH resources.

Some aspects of the present disclosure include non-transitory computer readable media having instructions stored therein that, when executed by one or more processors of a user equipment (UE), cause the one or more processors to identify first scheduling information indicating a sidelink downlink control information (S-DCI) resource, identify second scheduling information indicating one or more physical sidelink feedback channel (PSFCH) resource, and transmit control information via at least one of the S-DCI resource or the one or more PSFCH resources.

Aspects of the present disclosure include methods by a user equipment (UE) for transmitting first-stage sidelink control information (SCI-1) in a first resource and transmitting second-stage sidelink control information (SCI-2), after transmitting the SCI-1, in a second resource, wherein the SCI-2 includes a new data indicator (NDI) value indicating that the SCI-2 is a retransmission of the SCI-1.

Other aspects of the present disclosure include a user equipment (UE) having a memory comprising instructions, a transceiver, and one or more processors operatively coupled with the memory and the transceiver, the one or more processors configured to execute instructions in the memory to transmit, via the transceiver, first-stage sidelink control information (SCI-1) in a first resource and transmit, via the transceiver, second-stage sidelink control information (SCI-2), after transmitting the SCI-1, in a second resource, wherein the SCI-2 includes a new data indicator (NDI) value indicating that the SCI-2 is a retransmission of the SCI-1.

An aspect of the present disclosure includes a user equipment (UE) including means for transmitting first-stage sidelink control information (SCI-1) in a first resource and means for transmitting second-stage sidelink control information (SCI-2), after transmitting the SCI-1, in a second resource, wherein the SCI-2 includes a new data indicator (NDI) value indicating that the SCI-2 is a retransmission of the SCI-1.

Some aspects of the present disclosure include non-transitory computer readable media having instructions stored therein that, when executed by one or more processors of a user equipment (UE), cause the one or more processors to transmit first-stage sidelink control information (SCI-1) in a first resource and transmit second-stage sidelink control information (SCI-2), after transmitting the SCI-1, in a second resource, wherein the SCI-2 includes a new data indicator (NDI) value indicating that the SCI-2 is a retransmission of the SCI-1.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
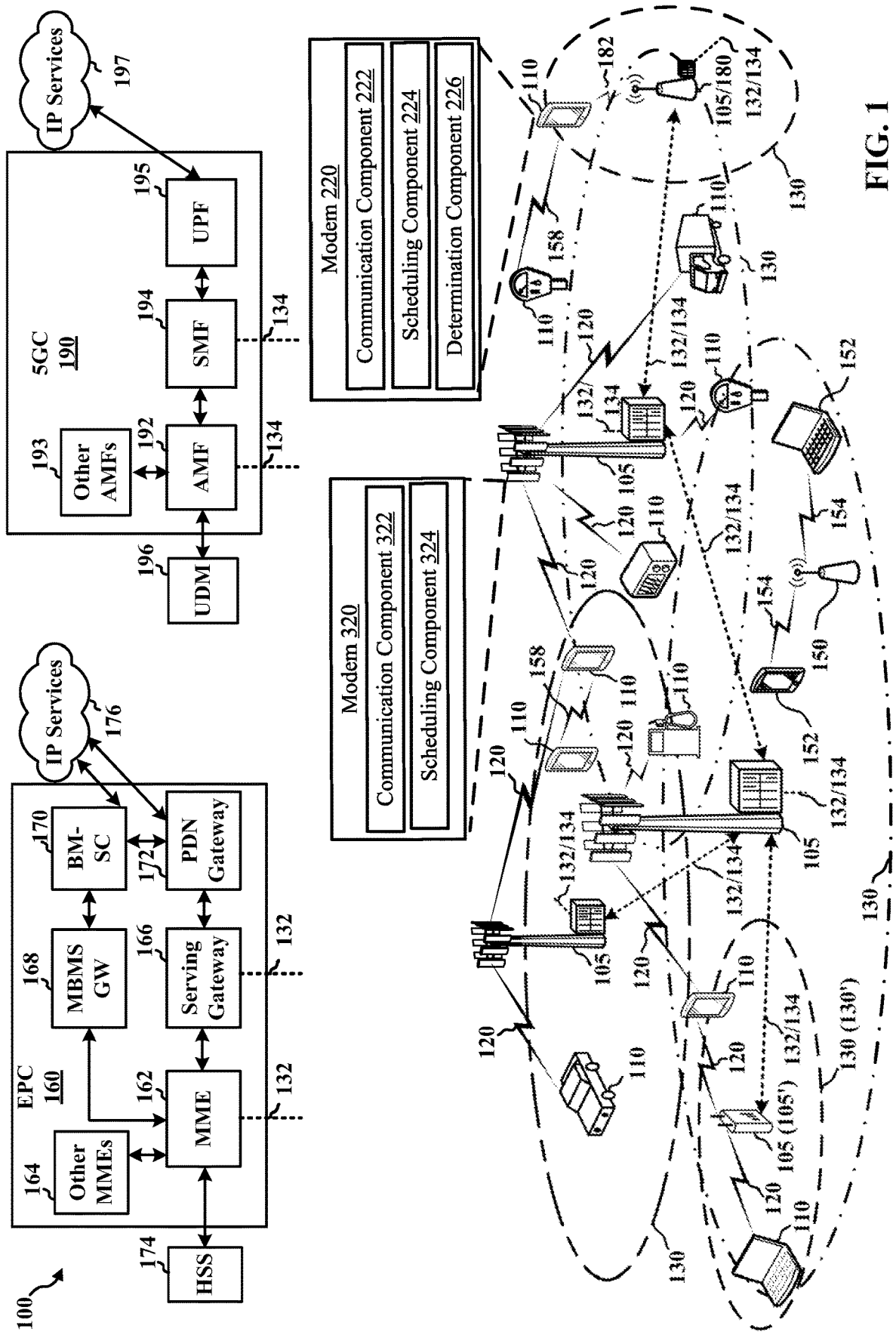
FIG. 1 is a diagram illustrating an example of a wireless communications system and an access network according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In one implementation, user equipments (UEs) may communicate with each other directly via sidelink communication protocols, with or without involving a base station. Examples of UEs may include programmable logical controllers (PLCs) and sensors/actuators (SAs). In an example, a PLC may communicate directly with one or more SAs (i.e., sidelink communication). The control information for supporting the sidelink communication may be transmitted by the PLC to the one or more SAs (i.e., sidelink downlink control information, or S-DCI), and/or from the one or more SAs to the PLC (i.e., sidelink uplink control information, or S-UCI).

In one aspect of the present disclosure, a base station (BS) or the PLC may schedule S-UCI resources and physical sidelink feedback channel (PSFCH) resources for the uplink transmission of control information by the one or more SAs. In a first implementation, the one or more SAs may transmit the control information in both the S-UCI resources and the PSFCH resources. In a second implementation, the one or more SAs may choose the earliest resources (of the S-UCI resources and the PSFCH resources) to transmit the control information. In a third implementation, the one or more SAs may transmit the control information via the S-UCI resources without transmitting via the PSFCH resources. In a fourth implementation, the one or more SAs may receiving a configuration message indicating the resources (the S-UCI resources or the PSFCH resources) for transmitting the control information. In a fifth implementation, the one or more SAs may transmit the control information via the PSFCH resources.

In some aspects of the present disclosure, the BS or the PLC may schedule S-DCI resources and PSFCH resources for the downlink transmission of control information by the PLC. In a first implementation, the PLC may transmit the control information to the one or more SAs via the PSFCH resources if the one or more SAs are legacy sidelink devices. In a second implementation, the PLC may transmit the control information via the S-DCI resources and the PSFCH resources. In a third implementation, the PLC may choose the earliest resources (of the S-DCI resources and the PSFCH resources) to transmit the control information. In a fourth implementation, the PLC may transmit the control information via the S-DCI resources without transmitting via the PSFCH resources.

In certain aspects of the present disclosure, the PLC may ignore PSFCH and return HARQ via second-stage sidelink control information (SCI-2). The PLC may toggle a new data indicator of the SCI-2 to indicate retransmission in the same slot.

An example of sidelink communication may include cellular vehicle to everything (CV2X) applications. To receive sidelink packets, the receiver (RX) may perform blind decoding in some or all sub-channels. The number of sub-channels may range from, e.g., 1-27 channels. Physical sidelink control channel (PSCCH) and physical sidelink shared channel (PSSCH) may be transmitted within a same slot. PSSCH may occupy up to $N_{subchannel}^{SL}$ contiguous sub-channels. PSCCH may occupy one sub-channel with the lowest sub-channel index. The first-stage SCI (SCI-1) may be transmitted in PSCCH containing information about PSSCH bandwidth and resource reservation in future slots. The second-stage SCI (SCI-2) may be found and decoded after decoding PSCCH. The source identification (ID) and/ or destination ID may be used to identify the transmitting UE and the receiving UE of the packet, respectively. The size of the sub-channels in vehicle to everything (V2X) may be 10 or more resource blocks (RBs). In CV2X, the UEs may decode all transmissions and blind decode all sub-channels.

The SCI 1_0 in PSCCH, the frequency domain resource allocation (FDRA) may allocate $$\left\lceil \log \frac{N_{subchannel}^{SL}(N_{subchannel}^{SL}+1)}{2} \right\rceil$$

bits for 2 reservations and $$\left\lceil \log \frac{N_{subchannel}^{SL}(N_{subchannel}^{SL}+1)(2N_{subchannel}^{SL}+1)}{6} \right\rceil$$

bits for 3 reservations. The time domain allocation (TDRA) may allocate 5 bits for 2 reservations and 9 bits for 3 reservations.

In some implementations, PSCCH may be configured or preconfigured to occupy, 10, 12, 15, 20, 25 or other number of RBs, which may be limited to a single sub-channel. PSCCH duration may be configured or preconfigured to 2 or 3 symbols. A sub-channel may occupy 10, 12, 15, 20, 25 or other number of RBs. The number of sub-channels may be 1-27, for example, in a resource pool (RP). PSCCH size may be fixed for a resource pool, such as 10% to 100% of a sub-channel (first 2 or 3 symbols), depending on the configuration. PSSCH may occupy at least 1 sub-channel and/or contain SCI-2.

In CV2X, there may be two methods of resource allocation. In mode 1, the BS (such as a gNB) assigns transmit (TX) resources for sidelink communications through downlink control information, such as DCI 3_0. In mode 2, the transmitting UE may autonomously determine the resources for sidelink communications. The receiving device may behave similarly in mode 1 and mode 2.

In some implementations, mode 1 may support dynamic grants (DG), configured grants (CG) type 1, and CG type 2. CG type 1 may be activated via radio resource control (RRC) signaling from the BS. DCI 3_0 may be transmitted by the BS to allocate time and frequency resources and indicate transmission timing. The modulation and coding scheme (MCS) may be up to the UE within a limit set by the BS.

In an implementation, during mode 2, the transmitting UE may perform channel sensing by blindly decoding some or all PSCCH channels and identify reserved resources by other sidelink transmissions (if any). The transmitting UE may report available resources to upper layer and the upper layer may decide resource usage.

In some instances of industrial internet of things (IoT), sidelink may enable direct programmable logical controller and sensor/actuator communications. A wireless PLC may be flexible and allow for simple deployment. Each PLC may control a number of SAs, such as 20-50 SAs as an example. Such a scheme may satisfy a tight latency (e.g., 1-2 milliseconds (ms)) and ultra-reliability requirement (e.g., $10^{-6}$ error rate). Communication through one or more BSs may require multiple over the air (OTAs) transmissions, which may negatively impact latency and/or reliability.

Some example traffic characteristics of industrial IoT may be as follows: IoT traffic may typically be deterministic and/or with small packet size (e.g., 32-256 bytes). Since the required bandwidth is low, 2 RBs may be sufficient in some cases. The SAs may have constraints on UE capabilities in terms of bandwidth and processing power. The overall bandwidth may be large (e.g., 100 Megahertz or above) for IoT with dedicated frequency bands and/or unlicensed bands. The SAs may not need to detect and/or monitor all transmissions. PSCCH may be required to meet stringent IoT requirements. The radio frequency (RF) environment may include blockage and/or interference.

In some aspects of the present disclosure, SCI-1 in sidelink (e.g., SCI 1-A in PSSCH) may include bits for various fields, such as priority, frequency resource assignment, time resource assignment, resource reservation, reference signals/patterns, SCI-2 format, reference signal port, MCS, and/or reserved bits. For example, the SCI-1 may include 3 bits for priority. For frequency resource assignment, the number of bits may depend on the number of slot reservations and/or the number of sub-channels. For time resource assignment, 5 bits may be allocated for 2 reservations and 9 bits may be allocated for 3 reservations. During the resource reservation period, the number of bits may depend on the number of allowed periods. For the demodulation reference signal (DMRS) pattern, the number of bits may depend on the number of configured patterns. For SCI-2 format, 2 bits may be allocated. The beta offset for SCI-2 rate matching may include 2 bits. For DMRS port, a 1-bit field may indicate one or two data layers. For MCS, 5 bits may be used. For additional MCS table, 0-2 bits may be used. PSFCH overhead indicator may include 0 or 1 bit. Additional reserved bits may also be implemented for the upper layer. SCI-1 may be decoded by the intended receiving device and/or other sidelink UEs (e.g., in mode 2) to allow channel sensing and avoid resource collision.

In some aspects of the present disclosure, SCI-2 in sidelink (e.g., in PSSCH) may be front-loaded. The SCI-2 may include bits for various fields such as NDI, HARQ ID, source ID, destination ID, HARQ enable/disable, redundancy version, cast type, channel state information/request, zone ID, and/or communication range. The number of bits for HARQ ID may depend on the number of HARQ processes. The SCI-2 may include 1 bit for NDI. The SCI-2 may include 2 bits for the redundancy version identifier (RV-ID). The SCI-2 may include 8 bits for the source ID. The SCI-2 may include 16 bits for the destination ID. The SCI-2 may include 1 bit to indicate HARQ enable/disable. In some implementations, SCI 2-A may include 2 bits to indicate cast type (e.g., broadcast, groupcast, unicast, etc.). The SCI 2-A may include 1 bit for channel state information (CSI) request. In some implementations, SCI 2-B may include 12 bits for the zone ID. The SCI 2-B may include 4 bits for the communication range. In an implementation, the SCI-2 may be intended for the receiving UE to decode PSSCH.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells. In one implementation, the UE 110 may include a communication component 222 configured to communicate with other UEs 110 via a sidelink communication network, a cellular network, a Wi-Fi network, or other wireless and wired networks. The UE 110 may include a scheduling component 224 for determining and/or identifying resources. The UE 110 may include a determination component 226 that determines the times of resources allocated (which resource is earlier). In some implementations, the communication component 222, the scheduling component 224, and/or the determination component 226 may be implemented using hardware, software, or a combination of hardware and software. In some implementations, the BS 105 may include a communication component 322 configured to communicate with the UE 110. The BS 105 may include a scheduling component 324 configured to allocate resources to UEs 110 for sidelink communication during mode 1. In some implementations, the communication component 322 and/or the scheduling component 324 may be implemented using hardware, software, or a combination of hardware and software.

A BS 105 configured for 4G Long-Term Evolution (LTE) (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
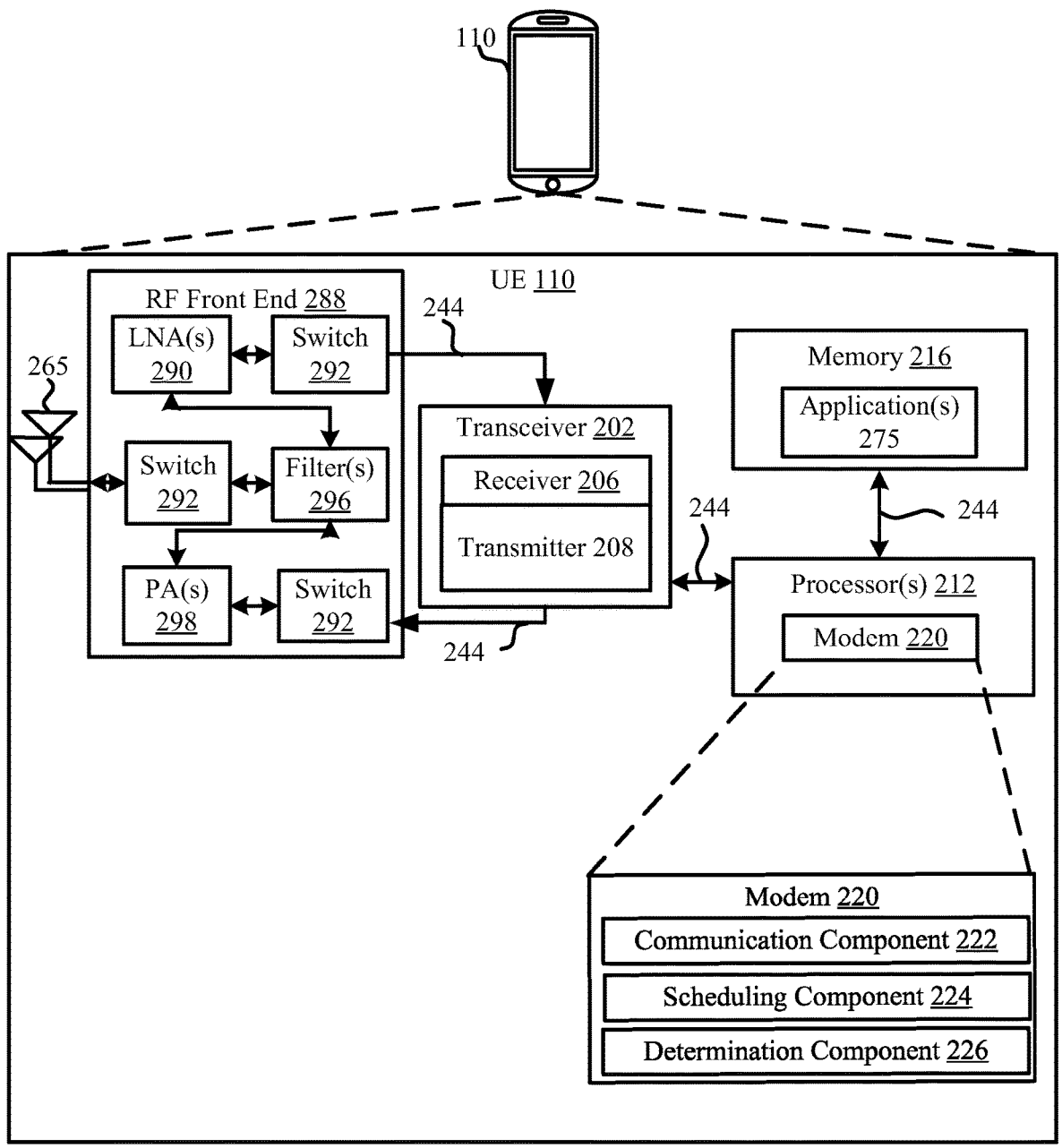
FIG. 2 is a schematic diagram of an example of a user equipment according to aspects of the present disclosure.

Referring to FIG. 2, one example of an implementation of the UE 110 may include a modem 220 having the communication component 222, the scheduling component 224, and/or the determination component 226. In one implementation, the UE 110 may include a communication component 222 configured to communicate with other UEs 110 via a sidelink communication network, a cellular network, a Wi-Fi network, or other wireless and wired networks. The UE 110 may include a scheduling component 224 for determining and/or identifying resources. The UE 110 may include a determination component 226 that determines the times of resources allocated (which resource is earlier).

In some implementations, the UE 110 may include a variety of components, including components such as one or more processors 212 and memory 216 and transceiver 202 in communication via one or more buses 244, which may operate in conjunction with the modem 220 and the communication component 222 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222, the scheduling component 224, and/or the determination component 226 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the processors 212. In other aspects, some of the features of the one or more processors 212 and/or the modem 220 associated with the communication component 222 may be performed by transceiver 202.

The memory 216 may be configured to store data used and/or local versions of application 275. Also, the memory 216 may be configured to store data used herein and/or local versions of the communication component 222, the scheduling component 224, and/or the determination component 226, and/or one or more of the subcomponents being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222, the scheduling component 224, and/or the determination component 226, and/or one or more of the subcomponents, and/or data associated therewith, when UE 110 is operating at least one processor 212 to execute the communication component 222, the scheduling component 224, and/or the determination component 226, and/or one or more of the subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a RF receiving device. In an aspect, the receiver 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
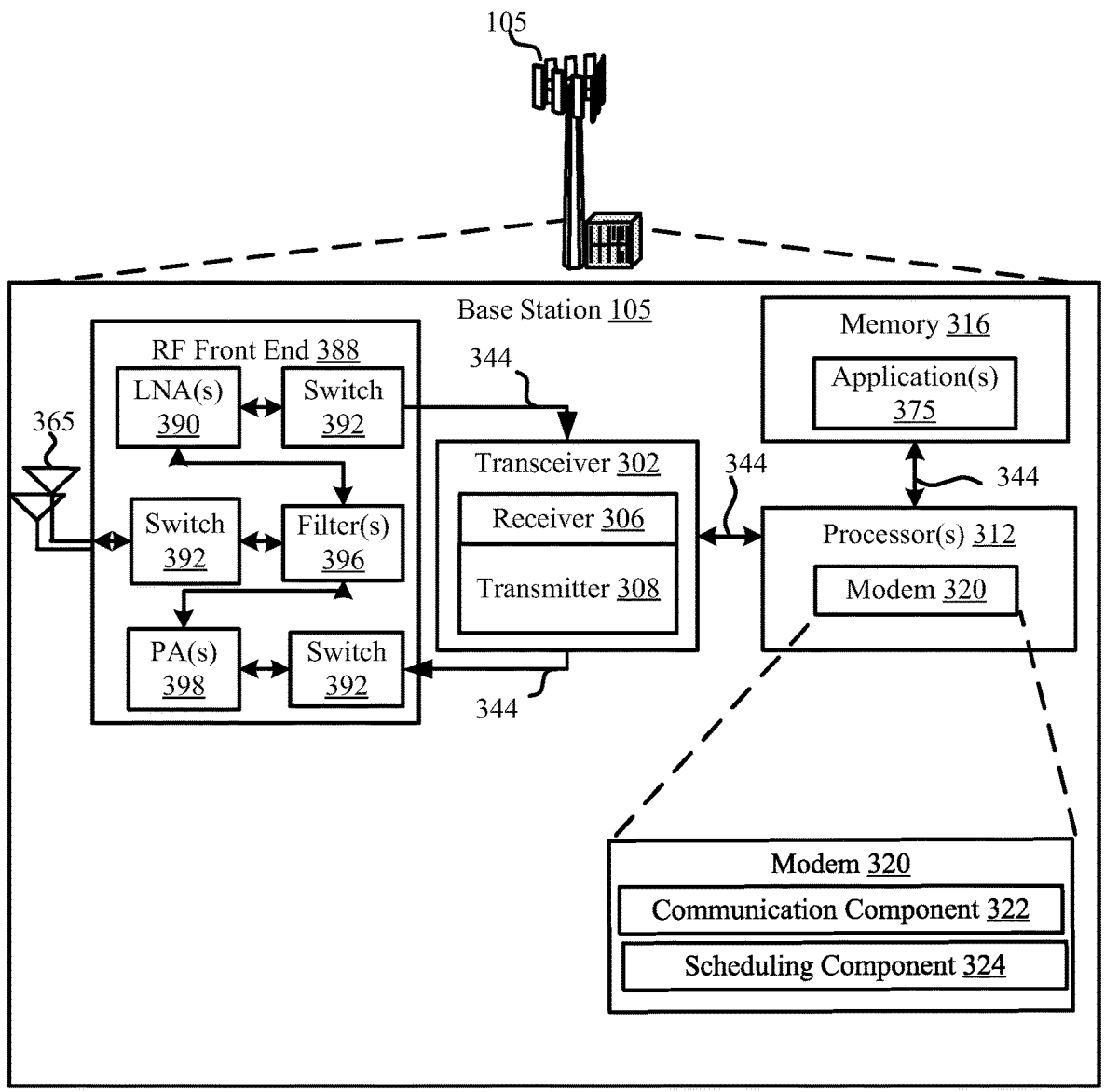
FIG. 3 is a schematic diagram of an example of a base station according to aspects of the present disclosure.

Referring to FIG. 3, one example of an implementation of the BS 105 may include a modem 320 having the communication component 322 and/or the scheduling component 324. In some implementations, the BS 105 may include a communication component 322 configured to communicate with the UE 110. The BS 105 may include a scheduling component 324 configured to allocate resources to UEs 110 for sidelink communication during mode 1.

In some implementations, the BS 105 may include a variety of components, including components such as one or more processors 312 and memory 316 and transceiver 302 in communication via one or more buses 344, which may operate in conjunction with the modem 320 and the communication component 322 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322 and/or the scheduling component 324 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

The memory 316 may be configured to store data used herein and/or local versions of applications 375. Also, the memory 316 may be configured to store data used herein and/or local versions of the communication component 322 and/or the scheduling component 324, and/or one or more of the subcomponents being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322 and/or the scheduling component 324, and/or one or more of the subcomponents, and/or data associated therewith, when the BS 105 is operating at least one processor 312 to execute the communication component 322 and/or the scheduling component 324, and/or one or more of the subcomponents.

Transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, a RF receiving device. In an aspect, receiver 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
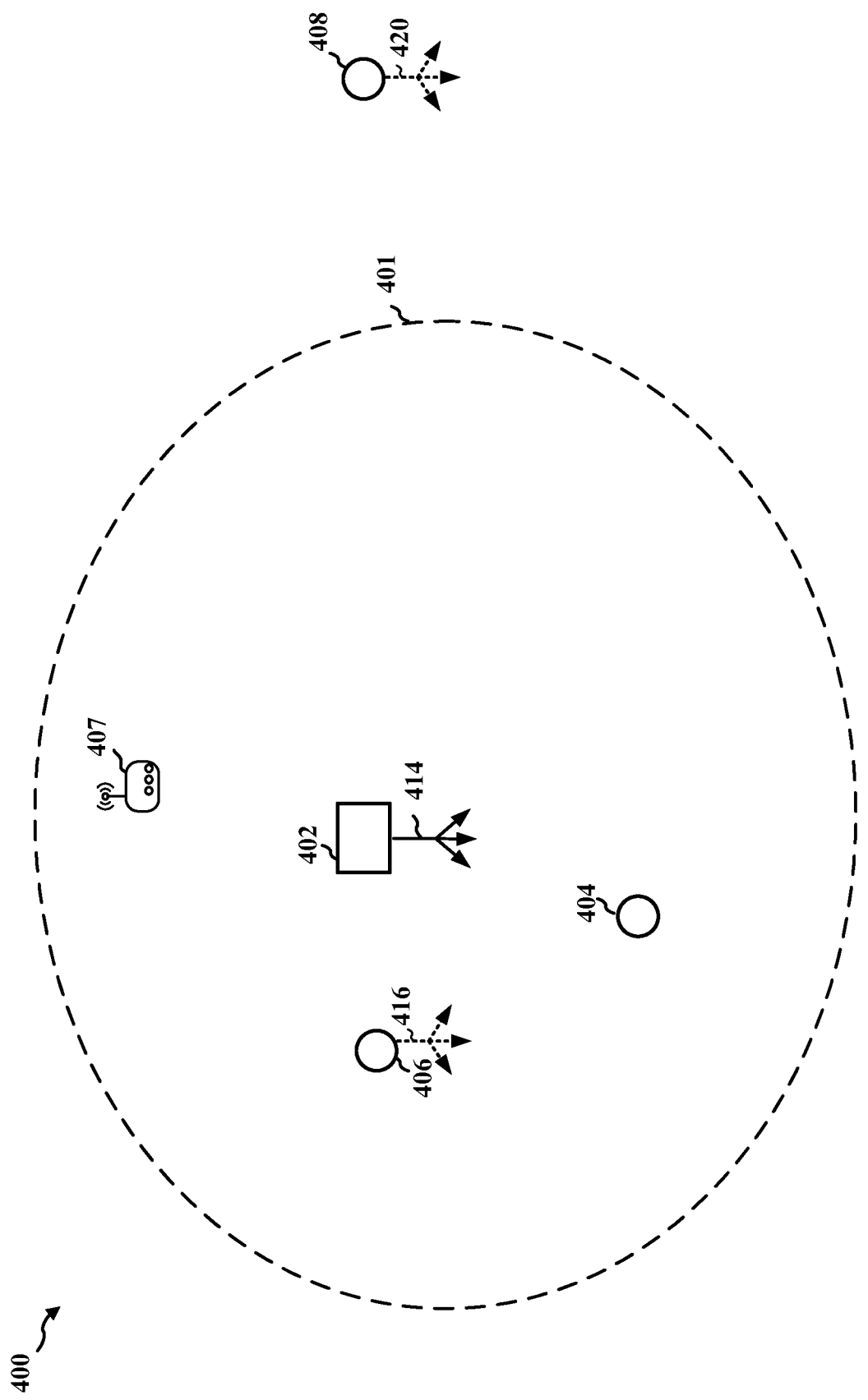
FIG. 4 illustrates an example of an environment 400 of wireless communication between devices based on V2X/V2V/D2D communication according to aspects of the present disclosure.

FIG. 4 illustrates an example of an environment 400 of wireless communication between devices based on sidelink communications, such as V2X/V2V/D2D communications. For example, PLC 402 (also known as an anchor) may transmit a transmission 414, e.g., comprising a control channel and/or a corresponding data channel, that may be received by SAs 404, 406, 408 (also known as clients). A control channel may include information for decoding a data channel and may also be used by a receiving device to avoid interference by refraining from transmitting on the occupied resources during a data transmission. The number of transmission time intervals (TTIs), as well as the RBs that will be occupied by the data transmission, may be indicated in a control message from the transmitting device. The PLC 402 and/or the SAs 404, 406, 408 may each be capable of operating as a transmitting device in addition to operating as a receiving device. Thus, SAs 406, 408 are illustrated as transmitting transmissions 416, 420. The transmissions 414, 416, 420 may be broadcasted or multicasted to nearby devices. For example, PLC 402 may transmit communication intended for receipt by other UEs within a range 401 of PLC 402. Additionally/alternatively, a roadside unit (RSU) 407 may receive communication from and/or transmit communication to the PLC 402 and/or the SAs 404, 406, 408.

The PLC 402, the SAs 404, 406, 408, and/or RSU 407 may include one or more of the communication component 222, the scheduling component 224, and/or the determination component 226.

Figure 5:
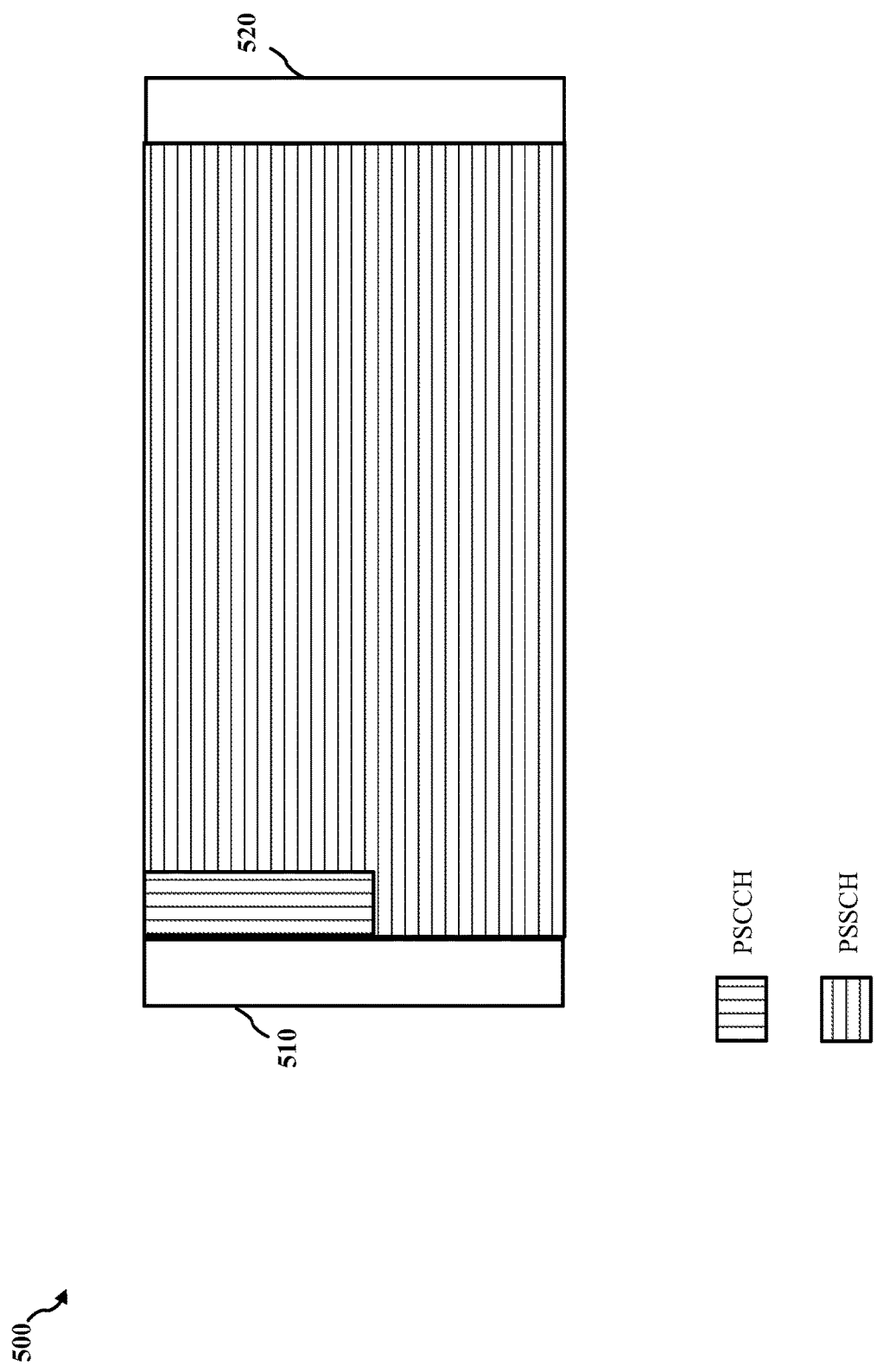
FIG. 5 illustrates example aspects of a sidelink physical layer structure according to aspects of the present disclosure.

FIG. 5 illustrates an example diagram of NR sidelink physical layer structure 500. In NR sidelink design, PSCCH carries sidelink control information (SCI) among wireless devices. The associated PSSCH carries data information. In NR, PSCCH and PSSCH may be time domain multiplexed. The first symbol in the slot is the automatic gain control (AGC) 510 for pre-process the control and/or data information and/or to normalize the incoming signal power. The last symbol is the gap symbol 520 (guard symbol).

Figure 6:
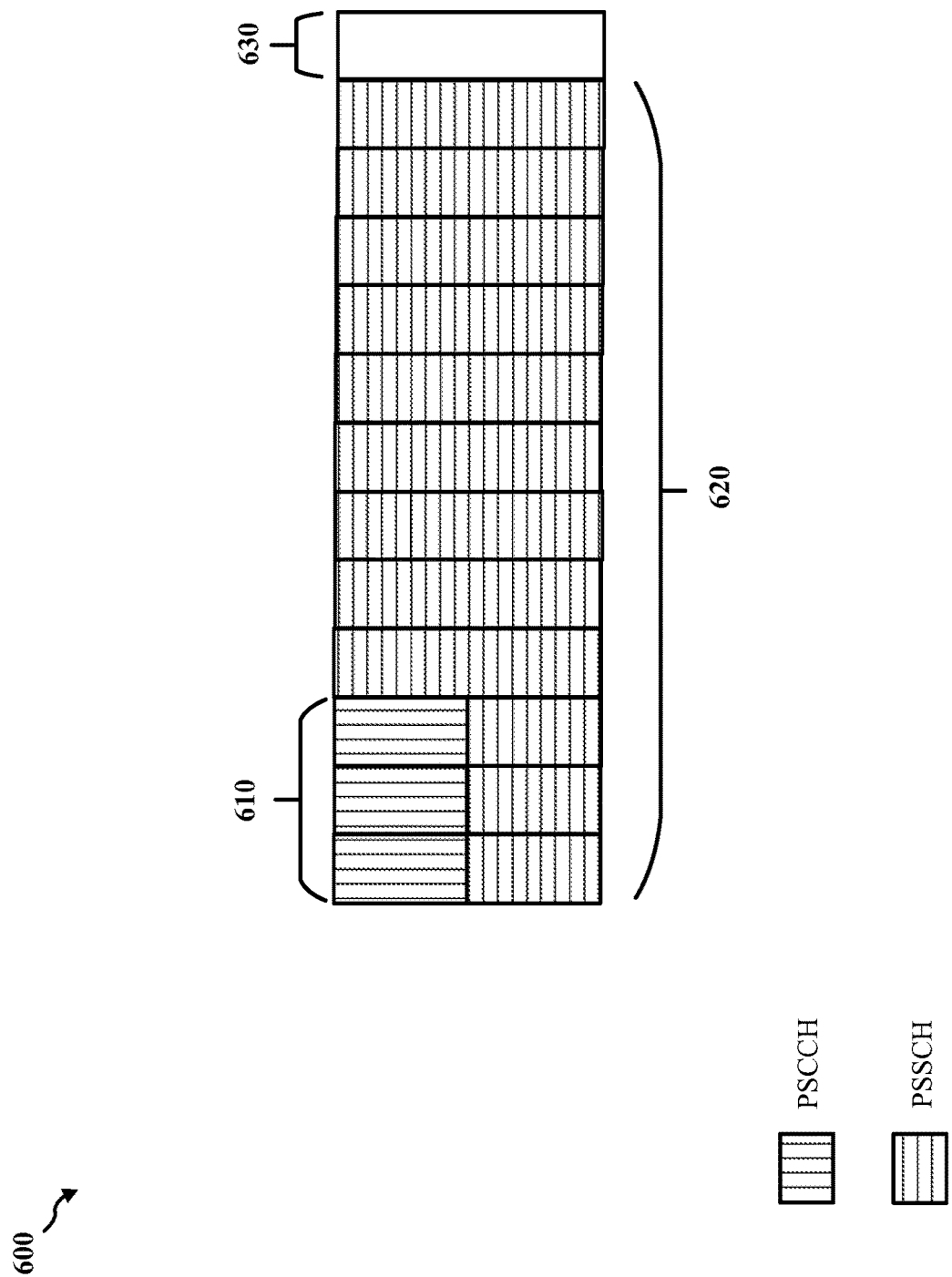
FIG. 6 illustrates an example of resources used for sidelink communication according to aspects of the present disclosure.

FIG. 6 illustrates an example of resources used for sidelink communication. In an implementation, resources 600 for sidelink communication may include PSCCH 610 allocated for the exchange of control information between UEs 110 during sidelink communication. The resources 600 may include PSSCH 620 allocated for data information. The resources 600 may include a gap 630 delimiting the resources 600 from neighboring resources.

Figure 7:
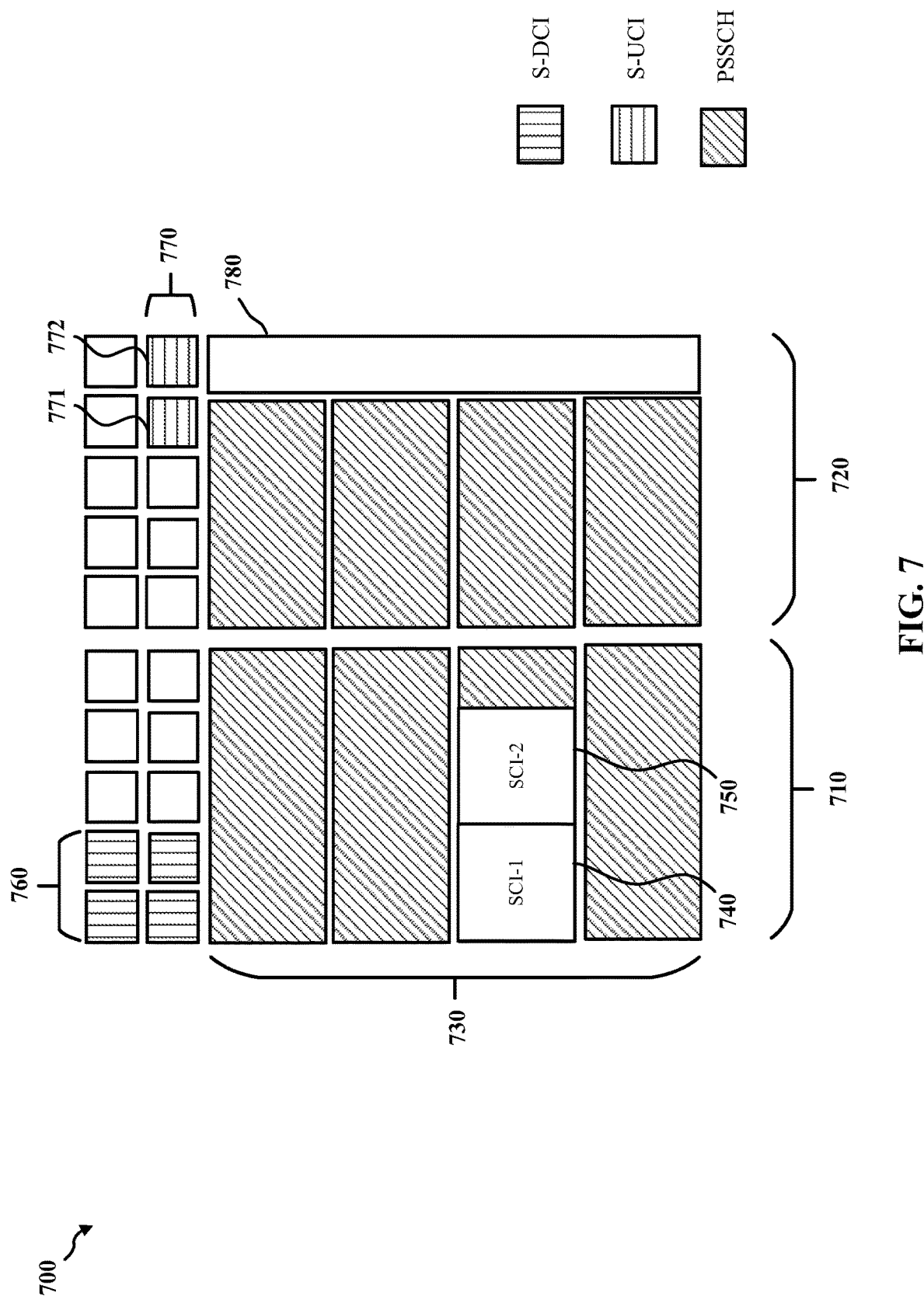
FIG. 7 illustrates an example of overlapping S-UCI and PSFCH resources according to aspects of the present disclosure.

FIG. 7 illustrates an example of overlapping S-UCI and PSFCH resources. In certain implementations, and referencing FIG. 4, resources 700 for transmitting sidelink control information (SCI) may include a first slot 710 and a second slot 720. The resources 700 may be allocated by the BS 105 (e.g., via the scheduling component 324) and/or the PLC 402 (e.g., via the scheduling component 224), depending on the mode. The first slot 710 may be allocated for downlink transmission. The PLC 402 may transmit downlink information (control and/or data) to one or more of the SAs 404, 406, 408 via resources in the first slot 710, such as the SA 406. The SA 406 may "listen" for downlink information in the first slot. The second slot 720 may be allocated for uplink transmission. The SA 406 may transmit uplink information (control and/or data) to the PLC 402 or other SAs via resources in the second slot 720. Examples of control information may include one or more of a resource selection, a collision detection, a channel state information (CSI) report, a HARQ acknowledgement, a HARQ negative acknowledgement, or a scheduling request (SR).

In some instances, the resources 700 may include a PSSCH+SCI portion 730 that includes resources (e.g., resource blocks) for PSSCH. The PSSCH+SCI portion 730 may include first-stage SCI (SCI-1) 740 and second-stage SCI (SCI-2) 750. As discussed above, the SCI-1 740 may include one or more bits for indicating priority, frequency resource assignment, time resource assignment, resource reservation period, DMRS pattern, SCI-2 format, beta offset, DMRS port, MCS, PSFCH overhead, and/or reserved. The SCI-2 750 may include one or more bits for indicating HARQ ID, NDI, RVID, source ID, destination ID, HARQ enable/disable, cast type, CSI request, zone ID, and/or communication range.

In some implementations, the resources 700 may be allocated for sidelink downlink control information (S-DCI) 760. The resources 700 may be allocated for sidelink uplink control information (S-UCI) 770. The resources 700 may be allocated for PSFCH 780. The resources for the S-UCI 770 may overlap with the resources for the PSFCH 780 because they are being allocated in the same slot, namely the second slot 720, and/or the same symbol. The BS 105 and/or the PLC 402 may allocate the resources for the S-UCI 770 and/or the PSFCH 780 for uplink transmission of control information by the SA 406. The SA 406 may receive scheduling information indicating the resources for the S-UCI 770 and the PSFCH 780 allocated by the BS 105. The SA 406 may transmit the uplink control information via at least one of the S-UCI 770 and/or the PSFCH 780.

In a first aspect of the present disclosure, the SA 406 may transmit the uplink control information via the S-UCI 770 and the PSFCH 780. The PSFCH 780 may offer an additional opportunity for the PLC 402 to receive and/or decode the control information. The PLC 402 may monitor one or both of the S-UCI 770 and the PSFCH 780. By transmitting the uplink control information via the S-UCI 770 and the PSFCH 780, diversity gain may be achieved (e.g., for HARQ report).

In a second aspect of the present disclosure, the SA 406 may determine (e.g., via the determination component 226) an earliest resource among the S-UCI 770 and the PSFCH 780. The SA 406 may transmit the uplink control information via the earliest resource to reduce latency. The SA 406 may refrain from transmitting the uplink control information via later resources. For example, the SA 406 may determine that a first S-UCI resource 771 is the earliest resource. The first S-UCI resource 771 may be temporally allocated earlier than a second S-UCI resource 772 and the PSFCH 780. As a result, the SA 406 may transmit the uplink control information in the first S-UCI resource 771 only, and refrain from transmitting the uplink control information in the second S-UCI resource 772 and/or the PSFCH 780.

In a third aspect of the present disclosure, the SA 406 may transmit the uplink control information via the S-UCI 770 and refrain from transmitting the control information via the PSFCH 780. The SA 406 may multiplex the uplink control information. The SA 406 may transmit the uplink control information via the S-UCI 770 to receivers (i.e., PLC 402) configured to receive control information via S-UCI resources.

In a fourth aspect of the present disclosure, the PLC 402 may transmit (e.g., via the communication component 222) an indicator indicating to the SA 406 which resource(s) to use for the uplink control information. The indication may indicate to the SA 406 to transmit the uplink control information via the S-UCI 770, the PSFCH 780, or both. The indication may be transmitted in S-DCI or an upper layer signaling. The PLC 402 may determine resource(s) for the transmission of the control information based on the sidelink communication channel latency and/or the priority requirement of the traffic/control information.

In a fifth aspect of present disclosure, the PLC 402 may schedule the PSFCH 780 along with the S-UCI 770. The PLC 402 may schedule the SA 404 to use the PSFCH for transmitting the uplink control information. The PSFCH 780 may be an extension of the S-UCI 770.

Figure 8:
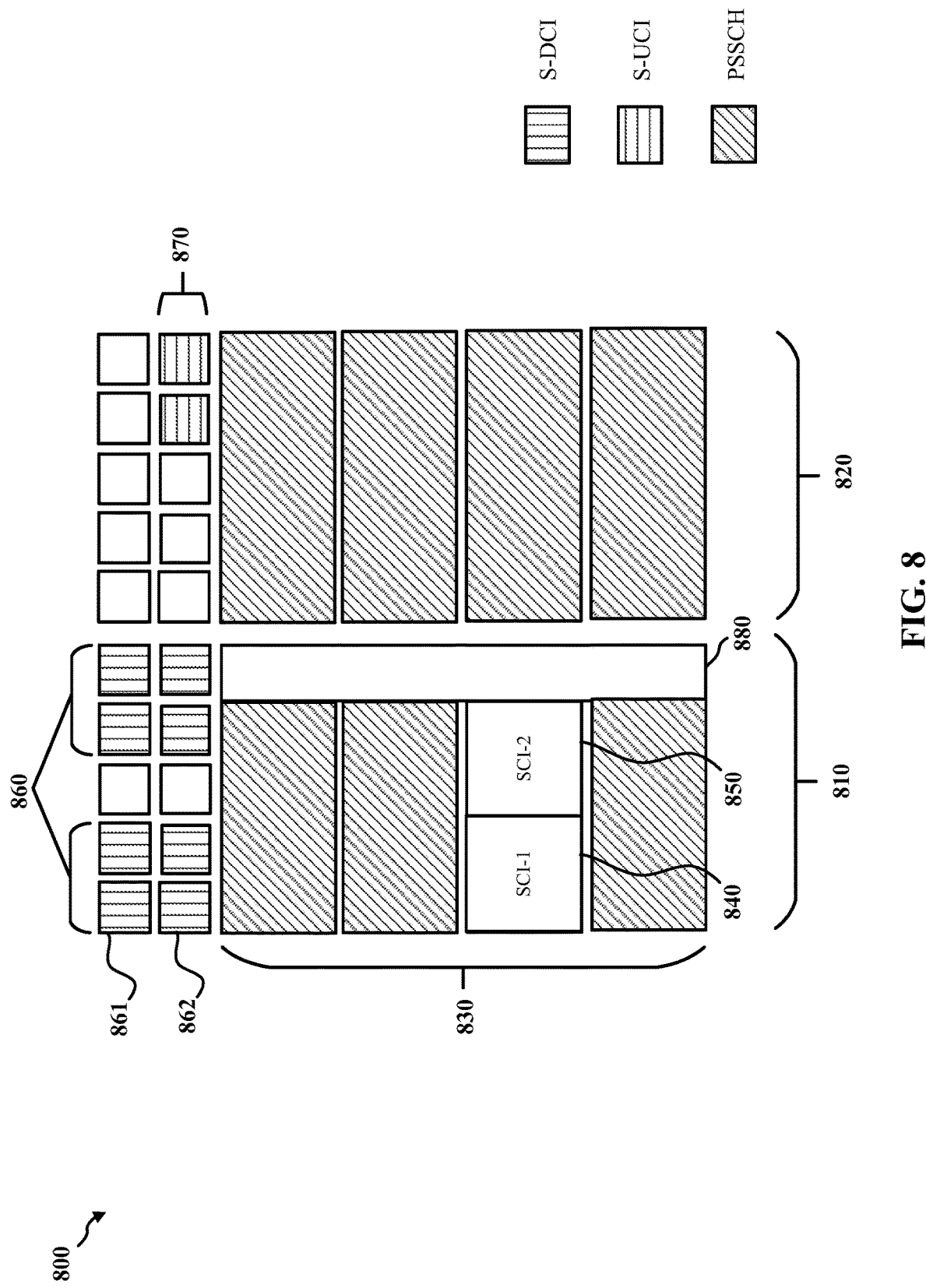
FIG. 8 illustrates an example of overlapping S-DCI and PSFCH resources according to aspects of the present disclosure.

FIG. 8 illustrates an example of overlapping S-DCI and PSFCH resources. In certain implementations, and referencing FIG. 4, resources 800 for transmitting SCI may include a first slot 810 and a second slot 820. The resources 800 may be allocated by the BS 105 (e.g., via the scheduling component 324) and/or the PLC 402 (e.g., via the scheduling component 224), depending on the mode. The first slot 810 may be allocated for downlink transmission. The PLC 402 may transmit downlink information (control and/or data) to one or more of the SAs 404, 406, 408 via resources in the first slot 810, such as the SA 406. The SA 406 may "listen" for downlink information in the resources 800. The second slot 820 may be allocated for uplink transmission. The SA 406 may transmit uplink information (control and/or data) to the PLC 402 or other SAs via resources in the second slot 820. Examples of control information may include one or more of a resource selection, a collision detection, a channel state information (CSI) report, a HARQ acknowledgement, a HARQ negative acknowledgement, or a scheduling request (SR).

In some instances, the resources 800 may include a PSSCH+SCI portion 830 that includes resources (e.g., resource blocks) for PSSCH. The PSSCH+SCI portion 830 may include first-stage SCI (SCI-1) 840 and second-stage SCI (SCI-2) 850. As discussed above, the SCI-1 840 may include one or more bits for indicating priority, frequency resource assignment, time resource assignment, resource reservation period, DMRS pattern, SCI-2 format, beta offset, DMRS port, MCS, PSFCH overhead, and/or reserved. The SCI-2 850 may include one or more bits for indicating HARQ ID, NDI, RVID, source ID, destination ID, HARQ enable/disable, cast type, CSI request, zone ID, and/or communication range.

In some implementations, the resources 800 may include sidelink downlink control information (S-DCI) 860. The resources 800 may include sidelink uplink control information (S-UCI) 870. The resources 800 may include PSFCH 880. The resources for the S-DCI 860 may overlap with the resources for the PSFCH 880 because they are being allocated in the same slot, namely the first slot 810, and/or the same symbol. The BS 105 and/or the PLC 402 may allocate the resources for the S-DCI 860 and/or the PSFCH 880 for downlink transmission of control information by the PLC 402. The PLC 402 may receive scheduling information indicating the resources for the S-DCI 860 and the PSFCH 880 allocated by the BS 105. The PLC 402 may transmit the downlink control information via at least one of the S-DCI 860 and/or the PSFCH 880.

In a first aspect of the present disclosure, the PLC 402 may transmit the downlink control information via the PSFCH 880. This scheme may be suitable for legacy SAs unable to receive and/or decode S-DCI.

In a second aspect of the present disclosure, the PLC 402 may transmit the downlink control information via the S-DCI 860 and the PSFCH 880. The PSFCH 880 may offer an additional opportunity for the SA 406 to receive and/or decode the control information. The SA 406 may monitor one or both of the S-UCI resources 870 and the PSFCH 880. By transmitting the uplink control information via the S-DCI 860 and the PSFCH 880, diversity gain may be achieved (e.g., for HARQ report).

In a third aspect of the present disclosure, the PLC 402 may determine (e.g., via the determination component 226) an earliest resource among the S-DCI 860 and the PSFCH 880. The PLC 402 may transmit the downlink control information via the earliest resource to reduce latency. The SA 406 may refrain from transmitting the downlink control information via later resources. For example, the PLC 402 may determine that a first S-DCI resource 861 and/or a second S-DCI resource 862 are the earliest resources. The first S-DCI resource 861 and the second S-DCI resource 862 may be temporally allocated earlier than the remaining resources of the S-DCI 860 and the PSFCH 880. As a result, the PLC 402 may transmit the downlink control information in the first S-DCI resource 861 and/or the second S-DCI only, and refrain from transmitting the downlink control information in the remaining resources of the S-DCI 860 and/or the PSFCH 880.

In a fourth aspect of the present disclosure, the PLC 402 may transmit the downlink control information via the S-DCI 860 and refrain from transmitting the control information via the PSFCH 880. The PLC 402 may multiplex the downlink control information. The PLC 402 may transmit the uplink control information via the S-DCI 860 to receivers (e.g., SAs 404, 406, 408) configured to receive control information via S-DCI 860. The S-DCI 860 may include more advanced coding. The S-DCI 860 may include error correction.

In a fifth aspect of the present disclosure, the PLC 402 may refrain from transmitting the control information via the S-DCI 860 or the PSFCH 880. The PLC 402 may return HARQ via SCI-2 NDI for the same HARQ-ID. The PLC 402 may toggle the NDI for the HARQ-ID if the SCI-2 850 transmission occurs (if the PLC 402 has traffic to the SA 406 in the first slot 810). For example, the PLC 402 may transmit the SCI-1 840 in the first slot 810. Next, the PLC 402 may transmit the SCI-2 850 in the same slot (i.e., the first slot 810). The SCI-2 850 may include a NDI value (e.g., not toggled) indicating the retransmission of a previous PSSCH. The current aspect may be used for Uu transmission interface.

Figure 9:
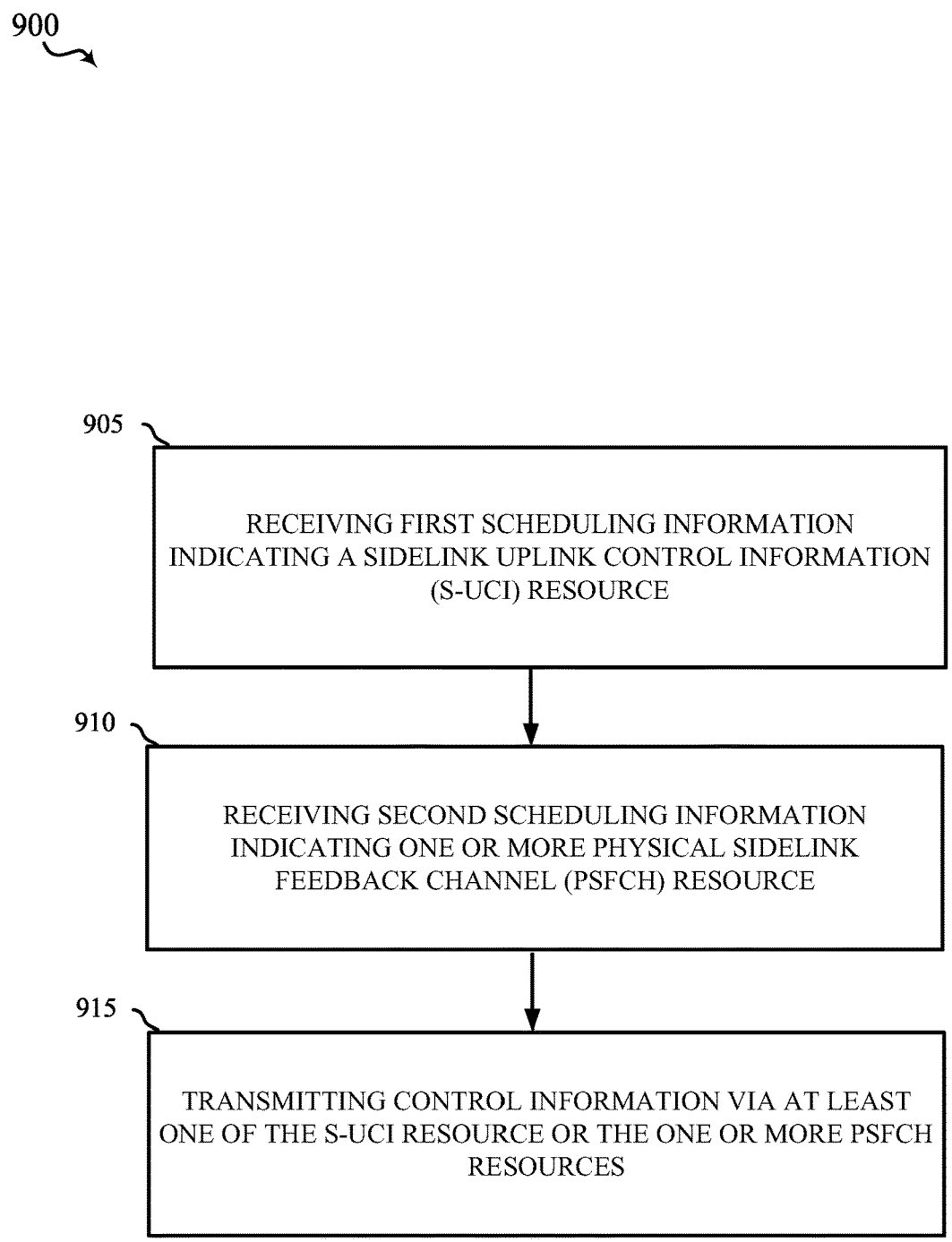
FIG. 9 is an example of a method for transmitting uplink sidelink control information according to aspects of the present disclosure.

FIG. 9 is an example of a method for transmitting uplink sidelink control information. For example, a method 900 may be performed by the one or more of the processor 212, the memory 216, the applications 275, the modem 220, the transceiver 202, the receiver 206, the transmitter 208, the RF front end 288, the communication component 222, the scheduling component 224, and/or the determination component 226, and/or one or more other components of the UE 110 in the wireless communication network 100.

At block 905, the method 900 may receive first scheduling information indicating a sidelink uplink control information (S-UCI) resource. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive first scheduling information indicating a sidelink uplink control information (S-UCI) resource as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving first scheduling information indicating a sidelink uplink control information (S-UCI) resource.

At block 910, the method 900 may receive second scheduling information indicating one or more physical sidelink feedback channel (PSFCH) resource. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may receive second scheduling information indicating one or more physical sidelink feedback channel (PSFCH) resource as described above. The RF front end 288 may receive the electrical signals converted from electro-magnetic signals. The RF front end 288 may filter and/or amplify the electrical signals. The transceiver 202 or the receiver 206 may convert the electrical signals to digital signals, and send the digital signals to the communication component 222.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for receiving second scheduling information indicating one or more physical sidelink feedback channel (PSFCH) resource.

At block 915, the method 900 may transmit control information via at least one of the S-UCI resource or the one or more PSFCH resources. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit control information via at least one of the S-UCI resource or the one or more PSFCH resources. The communication component 222 may send the digital signals to the transceiver 202 or the transmitter 208. The transceiver 202 or the transmitter 208 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting control information via at least one of the S-UCI resource or the one or more PSFCH resources.

Alternatively or additionally, the method 900 may further include any of the methods above, wherein transmitting the control information comprises transmitting the control information via the S-UCI resource and the one or more PSFCH resources.

Alternatively or additionally, the method 900 may further include any of the methods above, further comprising determining an earlier resource of the S-UCI resource and the one or more PSFCH resources, and wherein transmitting the control information comprises: transmitting the control information via the earlier resource, and refraining from transmitting the control information in the other resource.

Alternatively or additionally, the method 900 may further include any of the methods above, wherein transmitting the control information comprises transmitting the control information via the S-UCI resource, wherein the control information includes S-UCI bits and PSFCH bits, and refraining from transmitting the control information in the one or more PSFCH resources.

Alternatively or additionally, the method 900 may further include any of the methods above, further comprising receiving, prior to transmitting the control information, an indication indicating transmission of the control information via the S-UCI resource or the one or more PSFCH resources, and wherein transmitting the control information comprises transmitting the control information based on the indication.

Alternatively or additionally, the method 900 may further include any of the methods above, further comprising receiving an indication indicating transmission of the control information via a PSFCH resource of the one or more PSFCH resources, and wherein transmitting the control information comprises transmitting the control information via the PSFCH resource.

Alternatively or additionally, the method 900 may further include any of the methods above, wherein the control information includes at least one of a resource selection, a collision detection, a channel state information (CSI) report, a hybrid automatic repeat request (HARQ) acknowledgement, a HARQ negative acknowledgement, or a scheduling request.

Figure 10:
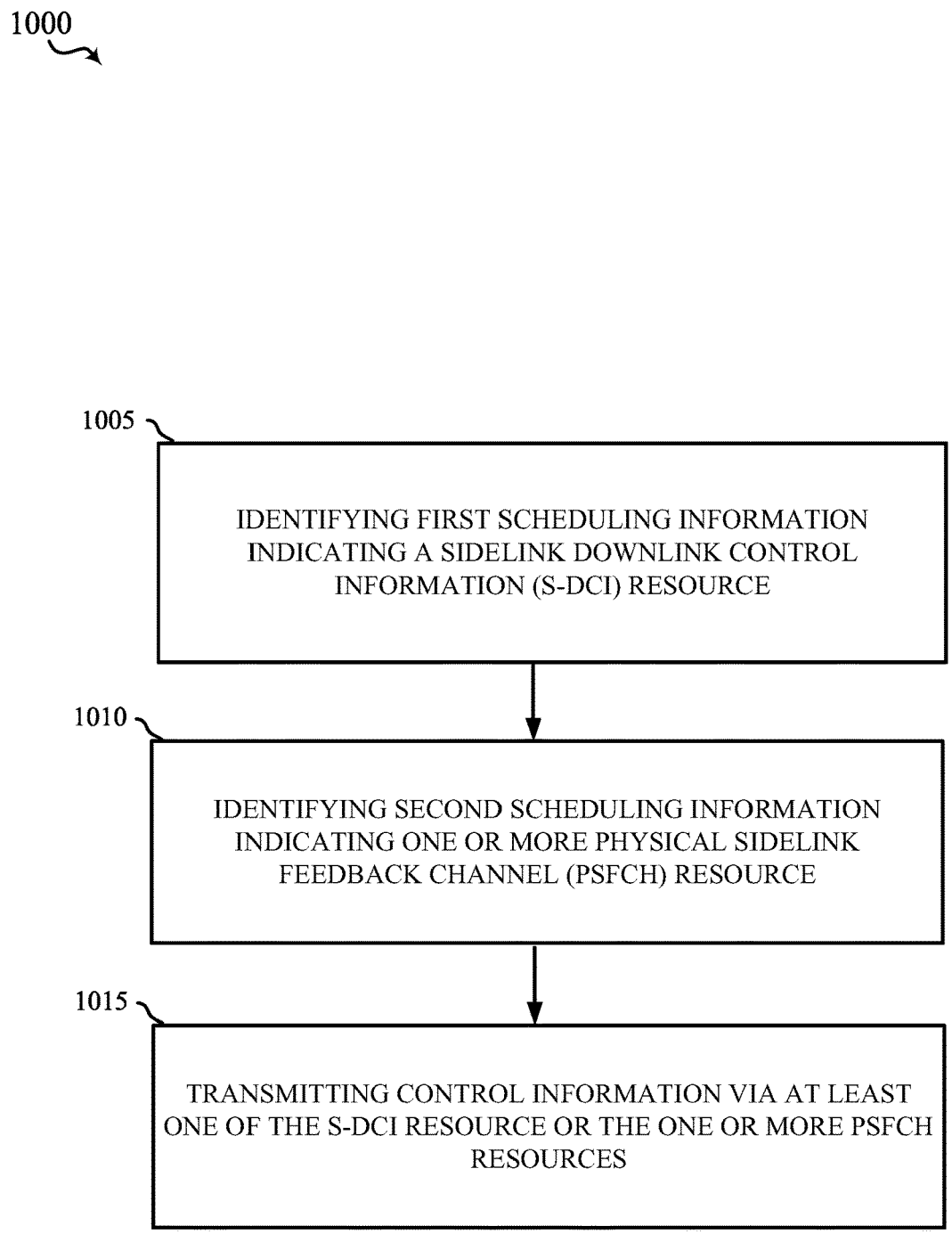
FIG. 10 is an example of a method for transmitting downlink sidelink control information according to aspects of the present disclosure.

FIG. 10 is an example of a method for transmitting downlink sidelink control information. For example, a method 1000 may be performed by the one or more of the processor 212, the memory 216, the applications 275, the modem 220, the transceiver 202, the receiver 206, the transmitter 208, the RF front end 288, the communication component 222, the scheduling component 224, and/or the determination component 226, and/or one or more other components of the UE 110 in the wireless communication network 100.

At block 1005, the method 1000 may identify first scheduling information indicating a sidelink downlink control information (S-DCI) resource. For example, the scheduling component 224, the processor 212, the memory 216, the modem 220, and/or the applications 275 of the UE 110 may identify first scheduling information indicating a sidelink downlink control information (S-DCI) resource as described above.

In certain implementations, the scheduling component 224, the processor 212, the memory 216, the modem 220, and/or the applications 275 may be configured to and/or may define means for identifying first scheduling information indicating a sidelink downlink control information (S-DCI) resource.

At block 1010, the method 1000 may identify second scheduling information indicating one or more physical sidelink feedback channel (PSFCH) resource. For example, the scheduling component 224, the processor 212, the memory 216, the modem 220, and/or the applications 275 of the UE 110 may identify second scheduling information indicating one or more physical sidelink feedback channel (PSFCH) resource as described above.

In certain implementations, the scheduling component 224, the processor 212, the memory 216, the modem 220, and/or the applications 275 may be configured to and/or may define means for identifying second scheduling information indicating one or more physical sidelink feedback channel (PSFCH) resource.

At block 1015, the method 1000 may transmit control information via at least one of the S-DCI resource or the one or more PSFCH resources. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit control information via at least one of the S-DCI resource or the one or more PSFCH resources. The communication component 222 may send the digital signals to the transceiver 202 or the transmitter 204. The transceiver 202 or the transmitter 204 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting control information via at least one of the S-DCI resource or the one or more PSFCH resources.

Alternatively or additionally, the method 1000 may further include any of the methods above, wherein transmitting the control information comprises transmitting the control information to a sidelink device via the one or more PSFCH resources.

Alternatively or additionally, the method 1000 may further include any of the methods above, wherein transmitting the control information comprises transmitting the control information to a sidelink device via the S-DCI resource and the one or more PSFCH resources.

Alternatively or additionally, the method 1000 may further include any of the methods above, further comprising determining an earlier resource of the S-DCI resource and the one or more PSFCH resources, and wherein transmitting the control information comprises: transmitting the control information via the earlier resource, and refraining from transmitting the control information in the other resource.

Alternatively or additionally, the method 1000 may further include any of the methods above, wherein transmitting the control information comprises transmitting the control information via the S-DCI resource, wherein the control information includes S-DCI bits and PSFCH bits, and refraining from transmitting the control information in the one or more PSFCH resources.

Alternatively or additionally, the method 1000 may further include any of the methods above, wherein the control information includes at least one of a resource selection, a collision detection, a channel state information (CSI) report, a hybrid automatic repeat request (HARQ) acknowledgement, a HARQ negative acknowledgement, or a scheduling request.

Figure 11:
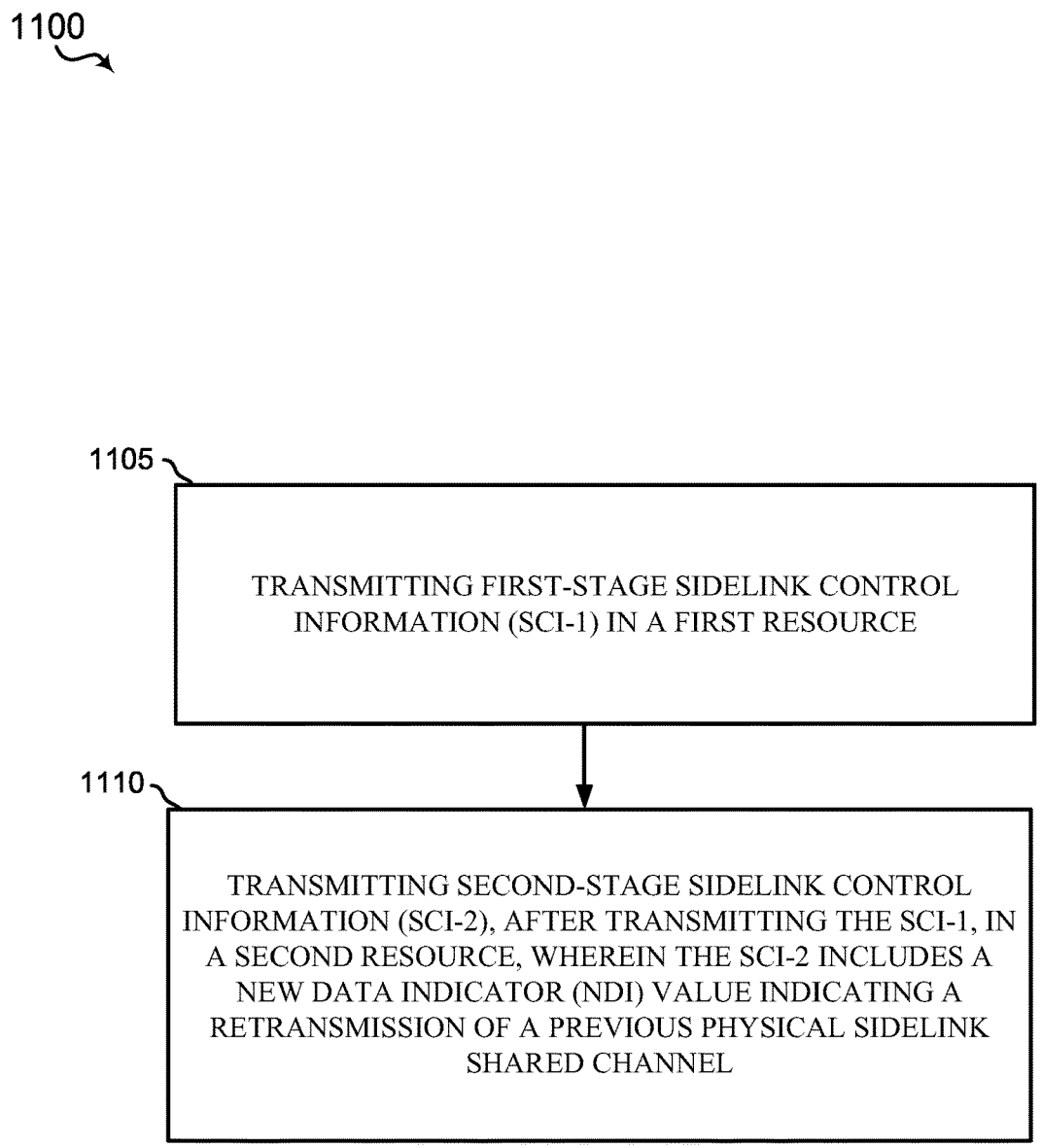
FIG. 11 is an example of a method for transmitting sidelink control information according to aspects of the present disclosure.

FIG. 11 is an example of a method for transmitting sidelink control information. For example, a method 1100 may be performed by the one or more of the processor 212, the memory 216, the applications 275, the modem 220, the transceiver 202, the receiver 206, the transmitter 208, the RF front end 288, the communication component 222, the scheduling component 224, and/or the determination component 226, and/or one or more other components of the UE 110 in the wireless communication network 100.

At block 1105, the method 1100 may transmit first-stage sidelink control information (SCI-1) in a first resource. For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit first-stage sidelink control information (SCI-1) in a first resource. The communication component 222 may send the digital signals to the transceiver 202 or the transmitter 204. The transceiver 202 or the transmitter 204 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting first-stage sidelink control information (SCI-1) in a first resource.

At block 1110, the method 1100 may transmit second-stage sidelink control information (SCI-2), after transmitting the SCI-1, in a second resource, wherein the SCI-2 includes a new data indicator (NDI) value indicating a retransmission of a previous physical sidelink shared channel (PSSCH). For example, the communication component 222, the transceiver 202, the receiver 206, the transmitter 208, the RF front end 288, the subcomponents of the RF front end 288, the processor 212, the memory 216, the modem 220, and/or the applications 275 of the UE 110 may transmit second-stage sidelink control information (SCI-2), after transmitting the SCI-1, in a second resource, wherein the SCI-2 includes a new data indicator (NDI) value indicating a retransmission of a previous physical sidelink shared channel (PSSCH). The communication component 222 may send the digital signals to the transceiver 202 or the transmitter 204. The transceiver 202 or the transmitter 204 may convert the digital signals to electrical signals and send to the RF front end 288. The RF front end 288 may filter and/or amplify the electrical signals. The RF front end 288 may send the electrical signals as electro-magnetic signals via the one or more antennas 265.

In certain implementations, the communication component 222, the transceiver 202, the receiver 206, the transmitter 208, the RF front end 288, the subcomponents of the RF front end 288, the processor 212, the memory 216, the modem 220, and/or the applications 275 may be configured to and/or may define means for transmitting second-stage sidelink control information (SCI-2), after transmitting the SCI-1, in a second resource, wherein the SCI-2 includes a new data indicator (NDI) value indicating a retransmission of a previous physical sidelink shared channel (PSSCH).

Additional Implementations

Aspects of the present disclosure include methods by a user equipment (UE) for receiving first scheduling information indicating a sidelink uplink control information (S-UCI) resource, receiving second scheduling information indicating one or more physical sidelink feedback channel (PSFCH) resource, and transmitting control information via at least one of the S-UCI resource or the one or more PSFCH resources.

Any of the methods above, wherein transmitting the control information comprises transmitting the control information via the S-UCI resource and the one or more PSFCH resources.

Any of the methods above, further comprising determining an earlier resource of the S-UCI resource and the one or more PSFCH resources, and wherein transmitting the control information comprises: transmitting the control information via the earlier resource, and refraining from transmitting the control information in the other resource.

Any of the methods above, wherein transmitting the control information comprises transmitting the control information via the S-UCI resource, wherein the control information includes S-UCI bits and PSFCH bits, and refraining from transmitting the control information in the one or more PSFCH resources.

Any of the methods above, further comprising receiving, prior to transmitting the control information, an indication indicating transmission of the control information via the S-UCI resource or the one or more PSFCH resources, and wherein transmitting the control information comprises transmitting the control information based on the indication.

Any of the methods above, further comprising receiving an indication indicating transmission of the control information via a PSFCH resource of the one or more PSFCH resources, and wherein transmitting the control information comprises transmitting the control information via the PSFCH resource.

Any of the methods above, wherein the control information includes at least one of a resource selection, a collision detection, a channel state information (CSI) report, a hybrid automatic repeat request (HARQ) acknowledgement, a HARQ negative acknowledgement, or a scheduling request.

Other aspects of the present disclosure include a user equipment (UE) having a memory comprising instructions, a transceiver, and one or more processors operatively coupled with the memory and the transceiver, the one or more processors configured to execute instructions in the memory to receive, via the transceiver, first scheduling information indicating a sidelink uplink control information (S-UCI) resource, receive, via the transceiver, second scheduling information indicating one or more physical sidelink feedback channel (PSFCH) resource, and transmit, via the transceiver, control information via at least one of the S-UCI resource or the one or more PSFCH resources.

Any of the UEs above, wherein transmitting the control information comprises transmitting, via the transceiver, the control information via the S-UCI resource and the one or more PSFCH resources.

Any of the UEs above, wherein the one or more processors are further configured to determine an earlier resource of the S-UCI resource and the one or more PSFCH resources, and wherein transmitting the control information comprises: transmitting, via the transceiver, the control information via the earlier resource, and refraining from transmitting the control information in the other resource.

Any of the UEs above, wherein transmitting the control information comprises transmitting, via the transceiver, the control information via the S-UCI resource, wherein the control information includes S-UCI bits and PSFCH bits, and refraining from transmitting the control information in the one or more PSFCH resources.

Any of the UEs above, wherein the one or more processors are further configured to receive, via the transceiver, prior to transmitting the control information, an indication indicating transmission of the control information via the S-UCI resource or the one or more PSFCH resources, and wherein transmitting the control information comprises transmitting the control information based on the indication.

Any of the UEs above, wherein the one or more processors are further configured to receive, via the transceiver, an indication indicating transmission of the control information via a PSFCH resource of the one or more PSFCH resources, and wherein transmitting the control information comprises transmitting, via the transceiver, the control information via the PSFCH resource.

Any of the UEs above, wherein the control information includes at least one of a resource selection, a collision detection, a channel state information (CSI) report, a hybrid automatic repeat request (HARQ) acknowledgement, a HARQ negative acknowledgement, or a scheduling request.

An aspect of the present disclosure includes a user equipment (UE) including means for receiving first scheduling information indicating a sidelink uplink control information (S-UCI) resource, means for receiving second scheduling information indicating one or more physical sidelink feedback channel (PSFCH) resource, and means for transmitting control information via at least one of the S-UCI resource or the one or more PSFCH resources.

Any of the UEs above, wherein means for transmitting the control information comprises means for transmitting the control information via the S-UCI resource and the one or more PSFCH resources.

Any of the UEs above, wherein means for transmitting the control information comprises means for determining an earlier resource of the S-UCI resource and the one or more PSFCH resources, and wherein means for transmitting the control information comprises: means for transmitting the control information via the earlier resource, and means for refraining from transmitting the control information in the other resource.

Any of the UEs above, wherein means for transmitting the control information comprises means for transmitting the control information via the S-UCI resource, wherein the control information includes S-UCI bits and PSFCH bits, and means for refraining from transmitting the control information in the one or more PSFCH resources.

Any of the UEs above, further comprising means for receiving, prior to transmitting the control information, an indication indicating transmission of the control information via the S-UCI resource or the one or more PSFCH resources, and wherein means for transmitting the control information comprises means for transmitting the control information based on the indication.

Any of the UEs above, further comprising means for receiving an indication indicating transmission of the control information via a PSFCH resource of the one or more PSFCH resources, and wherein means for transmitting the control information comprises means for transmitting the control information via the PSFCH resource.

Any of the UEs above, wherein the control information includes at least one of a resource selection, a collision detection, a channel state information (CSI) report, a hybrid automatic repeat request (HARQ) acknowledgement, a HARQ negative acknowledgement, or a scheduling request.

Some aspects of the present disclosure include non-transitory computer readable media having instructions stored therein that, when executed by one or more processors of a user equipment (UE), cause the one or more processors to receive first scheduling information indicating a sidelink uplink control information (S-UCI) resource, receive second scheduling information indicating one or more physical sidelink feedback channel (PSFCH) resource, and transmit control information via at least one of the S-UCI resource or the one or more PSFCH resources.

Any of the non-transitory computer readable media above, wherein the instructions for transmitting the control information further comprising instructions for transmitting the control information via the S-UCI resource and the one or more PSFCH resources.

Any of the non-transitory computer readable media above, further comprising instructions, when executed by the one or more processors, cause the one or more processors to determine an earlier resource of the S-UCI resource and the one or more PSFCH resources, and wherein transmitting the control information comprises: transmitting the control information via the earlier resource, and refraining from transmitting the control information in the other resource Any of the non-transitory computer readable media above, wherein the instructions for transmitting the control information further comprising instructions for transmitting the control information via the S-UCI resource, wherein the control information includes S-UCI bits and PSFCH bits, and refraining from transmitting the control information in the one or more PSFCH resources.

Any of the non-transitory computer readable media above, further comprising instructions, when executed by the one or more processors, cause the one or more processors to receive, prior to transmitting the control information, an indication indicating transmission of the control information via the S-UCI resource or the one or more PSFCH resources, and wherein transmitting the control information comprises transmitting the control information based on the indication.

Any of the non-transitory computer readable media above, further comprising instructions, when executed by the one or more processors, cause the one or more processors to receive an indication indicating transmission of the control information via a PSFCH resource of the one or more PSFCH resources, and wherein transmitting the control information comprises transmitting the control information via the PSFCH resource.

Any of the non-transitory computer readable media above, wherein the control information includes at least one of a resource selection, a collision detection, a channel state information (CSI) report, a hybrid automatic repeat request (HARQ) acknowledgement, a HARQ negative acknowledgement, or a scheduling request.

Aspects of the present disclosure include methods by a user equipment (UE) for identifying first scheduling information indicating a sidelink downlink control information (S-DCI) resource, identifying second scheduling information indicating one or more physical sidelink feedback channel (PSFCH) resource, and transmitting control information via at least one of the S-DCI resource or the one or more PSFCH resources.

Any of the methods above, wherein transmitting the control information comprises transmitting the control information to a sidelink device via the one or more PSFCH resources.

Any of the methods above, wherein transmitting the control information comprises transmitting the control information to a sidelink device via the S-DCI resource and the one or more PSFCH resources.

Any of the methods above, further comprising determining an earlier resource of the S-DCI resource and the one or more PSFCH resources, and wherein transmitting the control information comprises: transmitting the control information via the earlier resource, refraining from transmitting the control information in the other resource.

Any of the methods above, wherein transmitting the control information comprises transmitting the control information via the S-DCI resource, wherein the control information includes S-DCI bits and PSFCH bits, and refraining from transmitting the control information in the one or more PSFCH resources.

Any of the methods above, wherein the control information includes at least one of a resource selection, a collision detection, a channel state information (CSI) report, a hybrid automatic repeat request (HARQ) acknowledgement, a HARQ negative acknowledgement, or a scheduling request.

Other aspects of the present disclosure include a user equipment (UE) having a memory comprising instructions, a transceiver, and one or more processors operatively coupled with the memory and the transceiver, the one or more processors configured to execute instructions in the memory to identify first scheduling information indicating a sidelink downlink control information (S-DCI) resource, identify second scheduling information indicating one or more physical sidelink feedback channel (PSFCH) resource, and transmit, via the transceiver, control information via at least one of the S-DCI resource or the one or more PSFCH resources.

Any of the UEs above, wherein transmitting the control information comprises transmitting, via the transceiver, the control information to a sidelink device via the one or more PSFCH resources.

Any of the UEs above, wherein transmitting the control information comprises transmitting, via the transceiver, the control information to a sidelink device via the S-DCI resource and the one or more PSFCH resources.

Any of the UEs above, wherein the one or more processors are further configured to determine an earlier resource of the S-DCI resource and the one or more PSFCH resources, and wherein transmitting the control information comprises: transmitting, via the transceiver, the control information via the earlier resource, and refraining from transmitting the control information in the other resource.

Any of the UEs above, wherein transmitting the control information comprises transmitting, via the transceiver, the control information via the S-DCI resource, wherein the control information includes S-DCI bits and PSFCH bits, and refraining from transmitting the control information in the one or more PSFCH resources.

Any of the UEs above, wherein the control information includes at least one of a resource selection, a collision detection, a channel state information (CSI) report, a hybrid automatic repeat request (HARQ) acknowledgement, a HARQ negative acknowledgement, or a scheduling request.

An aspect of the present disclosure includes a user equipment (UE) including means for identifying first scheduling information indicating a sidelink downlink control information (S-DCI) resource, means for identifying second scheduling information indicating one or more physical sidelink feedback channel (PSFCH) resource, and means for transmitting control information via at least one of the S-DCI resource or the one or more PSFCH resources.

Any of the UEs above, wherein means for transmitting the control information comprises means for transmitting the control information to a sidelink device via the one or more PSFCH resources.

Any of the UEs above, wherein means for transmitting the control information comprises means for transmitting the control information to a sidelink device via the S-DCI resource and the one or more PSFCH resources.

Any of the UEs above, further comprising means for determining an earlier resource of the S-DCI resource and the one or more PSFCH resources, and wherein means for transmitting the control information comprises: means for transmitting the control information via the earlier resource, and means for refraining from transmitting the control information in the other resource.

Any of the UEs above, wherein means for transmitting the control information comprises means for transmitting the control information via the S-DCI resource, wherein the control information includes S-DCI bits and PSFCH bits, and means for refraining from transmitting the control information in the one or more PSFCH resources.

Any of the UEs above, wherein the control information includes at least one of a resource selection, a collision detection, a channel state information (CSI) report, a hybrid automatic repeat request (HARQ) acknowledgement, a HARQ negative acknowledgement, or a scheduling request.

Some aspects of the present disclosure include non-transitory computer readable media having instructions stored therein that, when executed by one or more processors of a user equipment (UE), cause the one or more processors to identify first scheduling information indicating a sidelink downlink control information (S-DCI) resource, identify second scheduling information indicating one or more physical sidelink feedback channel (PSFCH) resource, and transmit control information via at least one of the S-DCI resource or the one or more PSFCH resources.

Any of the non-transitory computer readable media above, wherein the instructions for transmitting the control information further comprising instructions for transmitting the control information to a sidelink device via the one or more PSFCH resources.

Any of the non-transitory computer readable media above, wherein the instructions for transmitting the control information further comprising instructions for transmitting the control information to a sidelink device via the S-DCI resource and the one or more PSFCH resources.

Any of the non-transitory computer readable media above, further comprising instructions, when executed by the one or more processors, cause the one or more processors to determine an earlier resource of the S-DCI resource and the one or more PSFCH resources, and wherein transmitting the control information comprises: transmitting the control information via the earlier resource, and refraining from transmitting the control information in the other resource.

Any of the non-transitory computer readable media above, wherein the instructions for transmitting the control information further comprising instructions for transmitting the control information via the S-DCI resource, wherein the control information includes S-DCI bits and PSFCH bits, and refraining from transmitting the control information in the one or more PSFCH resources.

Any of the non-transitory computer readable media above, wherein the control information includes at least one of a resource selection, a collision detection, a channel state information (CSI) report, a hybrid automatic repeat request (HARQ) acknowledgement, a HARQ negative acknowledgement, or a scheduling request.

Aspects of the present disclosure include methods by a user equipment (UE) for transmitting first-stage sidelink control information (SCI-1) in a first resource and transmitting second-stage sidelink control information (SCI-2), after transmitting the SCI-1, in a second resource, wherein the SCI-2 includes a new data indicator (NDI) value indicating that the SCI-2 is a retransmission of the SCI-1.

Other aspects of the present disclosure include a user equipment (UE) having a memory comprising instructions, a transceiver, and one or more processors operatively coupled with the memory and the transceiver, the one or more processors configured to execute instructions in the memory to transmit, via the transceiver, first-stage sidelink control information (SCI-1) in a first resource and transmit, via the transceiver, second-stage sidelink control information (SCI-2), after transmitting the SCI-1, in a second resource, wherein the SCI-2 includes a new data indicator (NDI) value indicating that the SCI-2 is a retransmission of the SCI-1.

An aspect of the present disclosure includes a user equipment (UE) including means for transmitting first-stage sidelink control information (SCI-1) in a first resource and means for transmitting second-stage sidelink control information (SCI-2), after transmitting the SCI-1, in a second resource, wherein the SCI-2 includes a new data indicator (NDI) value indicating that the SCI-2 is a retransmission of the SCI-1.

Some aspects of the present disclosure include non-transitory computer readable media having instructions stored therein that, when executed by one or more processors of a user equipment (UE), cause the one or more processors to transmit first-stage sidelink control information (SCI-1) in a first resource and transmit second-stage sidelink control information (SCI-2), after transmitting the SCI-1, in a second resource, wherein the SCI-2 includes a new data indicator (NDI) value indicating that the SCI-2 is a retransmission of the SCI-1.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE) in a network, comprising:
receiving first scheduling information indicating a sidelink uplink control information (S-UCI) resource;
receiving second scheduling information indicating one or more physical sidelink feedback channel (PSFCH) resources;
determining an earlier resource of the S-UCI resource and the one or more PSFCH resources; and
transmitting control information via at least one of the S-UCI resource or the one or more PSFCH resources, wherein the UE comprises a client and the control information comprises S-UCI, the S-UCI comprises control messages from the client to an anchor, wherein transmitting the control information comprises transmitting the control information via the earlier resource and refraining from transmitting the control information in a later resource.

2. The method of claim 1, wherein transmitting the control information comprises:
transmitting the control information via the S-UCI resource, wherein the control information includes S-UCI bits and PSFCH bits; and
refraining from transmitting the control information in the one or more PSFCH resources.

3. The method of claim 1, wherein:
the control information includes at least one of a resource selection, a collision detection, a channel state information (CSI) report, a hybrid automatic repeat request (HARQ) acknowledgement, a HARQ negative acknowledgement, or a scheduling request.

4. The method of claim 1, wherein the client comprise a sensor/actuator (SA) and the anchor comprises a programmable logical controller (PLC) that controls a plurality of SAs, the plurality of SAs comprising the SA.

5. The method of claim 1, wherein the S-UCI resource overlaps in time with the one or more PSFCH resources.

6. The method of claim 1, wherein the S-UCI resource are separate from PSSCH resources and from PSCCH resources.

7. A user equipment (UE), comprising:
a memory comprising instructions;
a transceiver; and
one or more processors operatively coupled with the memory and the transceiver, the one or more processors configured to:
receive, via the transceiver, first scheduling information indicating a sidelink uplink control information (S-UCI) resource;
receive, via the transceiver, second scheduling information indicating one or more physical sidelink feedback channel (PSFCH) resources;
determine an earlier resource of the S-UCI resource and the one or more PSFCH resources; and
transmit, via the transceiver, control information via at least one of the S-UCI resource or the one or more PSFCH resources, wherein the UE comprises a client and the control information comprises S-UCI, the S-UCI comprises control messages from the client to an anchor, wherein transmitting the control information comprises transmitting the control information via the earlier resource and refraining from transmitting the control information in a later resource.

8. The UE of claim 7, wherein transmitting the control information comprises:
transmitting, via the transceiver, the control information via the S-UCI resource, wherein the control information includes S-UCI bits and PSFCH bits; and
refraining from transmitting the control information in the one or more PSFCH resources.

9. The UE of claim 7, wherein:
the control information includes at least one of a resource selection, a collision detection, a channel state information (CSI) report, a hybrid automatic repeat request (HARQ) acknowledgement, a HARQ negative acknowledgement, or a scheduling request.

10. The UE of claim 7, wherein the client comprise a sensor/actuator (SA) and the anchor comprises a programmable logical controller (PLC) that controls a plurality of SAs, the plurality of SAs comprising the SA.

11. The UE of claim 7, wherein the S-UCI resource overlaps in time with the one or more PSFCH resources.

12. The UE of claim 7, wherein the S-UCI resource are separate from PSSCH resources and from PSCCH resources.

13. A non-transitory computer readable medium having instructions stored therein that, when executed by one or more processors of a user equipment (UE), cause the one or more processors to:
receive first scheduling information indicating a sidelink uplink control information (S-UCI) resource;
receive second scheduling information indicating one or more physical sidelink feedback channel (PSFCH) resources;
determining an earlier resource of the S-UCI resource and the one or more PSFCH resources; and
transmit control information via at least one of the S-UCI resource or the one or more PSFCH resources, wherein the UE comprises a client and the control information comprises S-UCI, the S-UCI comprises control messages from the client to an anchor, wherein transmitting the control information comprises transmitting the control information via the earlier resource and refraining from transmitting the control information in a later resource.

14. The non-transitory computer readable medium of claim 13, wherein the instructions for transmitting the control information further comprising instructions for:
transmitting the control information via the S-UCI resource, wherein the control information includes S-UCI bits and PSFCH bits; and
refraining from transmitting the control information in the one or more PSFCH resources.

15. The non-transitory computer readable medium of claim 13, wherein:
the control information includes at least one of a resource selection, a collision detection, a channel state information (CSI) report, a hybrid automatic repeat request (HARQ) acknowledgement, a HARQ negative acknowledgement, or a scheduling request.

16. The non-transitory computer readable medium of claim 13, wherein the client comprise a sensor/actuator (SA) and the anchor comprises a programmable logical controller (PLC) that controls a plurality of SAs, the plurality of SAs comprising the SA.

17. The non-transitory computer readable medium of claim 13, wherein the S-UCI resource overlaps in time with the one or more PSFCH resources.

18. The non-transitory computer readable medium of claim 13, wherein the S-UCI resource are separate from PSSCH resources and from PSCCH resources.

19. A user equipment (UE), comprising:
- means for receiving first scheduling information indicating a sidelink uplink control information (S-UCI) resource;
- means for receiving second scheduling information indicating one or more physical sidelink feedback channel (PSFCH) resources;
- means for determining an earlier resource of the S-UCI resource and the one or more PSFCH resources; and
- means for transmitting control information via at least one of the S-UCI resource or the one or more PSFCH resources, wherein the UE comprises a client and the control information comprises S-UCI, the S-UCI comprises control messages from the client to an anchor, wherein transmitting the control information comprises transmitting the control information via the earlier resource and refraining from transmitting the control information in a later resource.

20. The UE of claim 19, wherein means for transmitting the control information comprises:
- means for transmitting the control information via the S-UCI resource, wherein the control information includes S-UCI bits and PSFCH bits; and
- means for refraining from transmitting the control information in the one or more PSFCH resources.

21. The UE of claim 19, wherein:
- the control information includes at least one of a resource selection, a collision detection, a channel state information (CSI) report, a hybrid automatic repeat request (HARQ) acknowledgement, a HARQ negative acknowledgement, or a scheduling request.

22. The UE of claim 19, wherein the client comprise a sensor/actuator (SA) and the anchor comprises a programmable logical controller (PLC) that controls a plurality of SAs, the plurality of SAs comprising the SA.

23. The UE of claim 19, wherein the S-UCI resource overlaps in time with the one or more PSFCH resources.

24. The UE of claim 19, wherein the S-UCI resource are separate from PSSCH resources and from PSCCH resources.

* * * * *